United States Patent
Van Baelen et al.

(10) Patent No.: US 10,677,998 B2
(45) Date of Patent: Jun. 9, 2020

(54) RUGGEDIZED FIBER OPTIC CONNECTORS AND CONNECTION SYSTEMS

(71) Applicant: CommScope Connectivity Belgium BVBA, Kessel-Lo (BE)

(72) Inventors: David Jan Irma Van Baelen, Winksele (BE); Patrick Jacques Ann Diepstraten, Heusden-Zolder (BE); Philippe Coenegracht, Hasselt (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 16/433,208

(22) Filed: Jun. 6, 2019

(65) Prior Publication Data
US 2019/0369336 A1  Dec. 5, 2019

Related U.S. Application Data

(63) Continuation of application No. 15/675,189, filed on Aug. 11, 2017, now Pat. No. 10,317,628, which is a
(Continued)

(51) Int. Cl.
*G02B 6/36* (2006.01)
*G02B 6/38* (2006.01)

(52) U.S. Cl.
CPC .......... *G02B 6/387* (2013.01); *G02B 6/3831* (2013.01); *G02B 6/3871* (2013.01);
(Continued)

(58) Field of Classification Search
None
See application file for complete search history.

(56) References Cited

U.S. PATENT DOCUMENTS

| 6,151,432 A | 11/2000 | Nakajima et al. |
| 6,439,924 B1 | 8/2002 | Kooiman |

(Continued)

FOREIGN PATENT DOCUMENTS

| EP | 2 302 431 A1 | 3/2011 |
| EP | 2 354 825 A1 | 8/2011 |
| EP | 2 355 285 A1 | 10/2011 |

OTHER PUBLICATIONS

International Search Report and Written Opinion for International Application No. PCT/EP2014/068010 dated Nov. 17, 2014 (20 pages).

*Primary Examiner* — Jennifer Doan
(74) *Attorney, Agent, or Firm* — Merchant & Gould P.C.

(57) ABSTRACT

Example fiber optic connector systems have rugged, robust designs that are environmentally sealed and that are relatively easy to install and uninstall in the field. Some connector systems can be configured in the field to be compatible with different styles of fiber optic adapters. Some connectors include a first seal (90) on a release sleeve; and a second seal (88) between the release sleeve and a connector body. Other connectors include a seal (139) and a flexible latch (136) on a connector. Other connectors include a protective structure (228, 328, 428) that mounts over the fiber optic connector. Other connectors include a protective outer shell (528, 860) and a sealing and attachment insert (570, 570A, 876). Other connectors include a protective outer shell (728) and a fastener (780).

20 Claims, 31 Drawing Sheets

Related U.S. Application Data continuation of application No. 14/914,117, filed as application No. PCT/EP2014/068010 on Aug. 25, 2014, now Pat. No. 9,733,436.

(60) Provisional application No. 61/869,672, filed on Aug. 24, 2013, provisional application No. 61/971,967, filed on Mar. 28, 2014, provisional application No. 61/973,677, filed on Apr. 1, 2014.

(52) U.S. Cl.
CPC ......... *G02B 6/3887* (2013.01); *G02B 6/3897* (2013.01); *G02B 6/3825* (2013.01)

(56) References Cited

U.S. PATENT DOCUMENTS

| | | | |
|---|---|---|---|
| 6,579,014 B2 | 6/2003 | Melton et al. | |
| 6,648,520 B2 | 11/2003 | McDonald et al. | |
| 7,614,797 B2 | 11/2009 | Lu et al. | |
| 7,677,814 B2 | 3/2010 | Lu et al. | |
| 7,686,519 B2 | 3/2010 | Lu | |
| 7,744,286 B2 | 6/2010 | Lu et al. | |
| 7,772,258 B2 | 8/2010 | Ina et al. | |
| 7,802,926 B2 | 9/2010 | Leeman et al. | |
| 8,128,294 B2 | 3/2012 | Lu et al. | |
| 8,137,002 B2 | 3/2012 | Lu et al. | |
| 8,853,537 B2 | 10/2014 | Kempeneers et al. | |
| 8,861,919 B2 | 10/2014 | Alston et al. | |
| 8,917,967 B2 | 12/2014 | Kempeneers et al. | |
| 9,312,676 B2 | 4/2016 | Kempeneers et al. | |
| 9,671,569 B2 | 6/2017 | Kempeneers et al. | |
| 10,061,091 B2 | 8/2018 | Kempeneers et al. | |
| 10,317,628 B2 * | 6/2019 | Van Baelen | G02B 6/387 |
| 2005/0037656 A1 | 2/2005 | Cairns | |
| 2008/0175546 A1 | 7/2008 | Lu et al. | |
| 2008/0253717 A1 | 10/2008 | Cull et al. | |
| 2010/0061681 A1 | 3/2010 | Powell | |
| 2011/0158586 A1 | 6/2011 | Katagiyama et al. | |
| 2013/0072057 A1 | 3/2013 | Burris | |
| 2014/0064672 A1 | 3/2014 | Elenbaas | |
| 2014/0086534 A1 | 3/2014 | Lu et al. | |

* cited by examiner

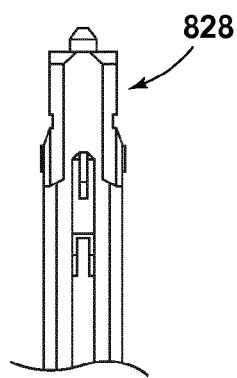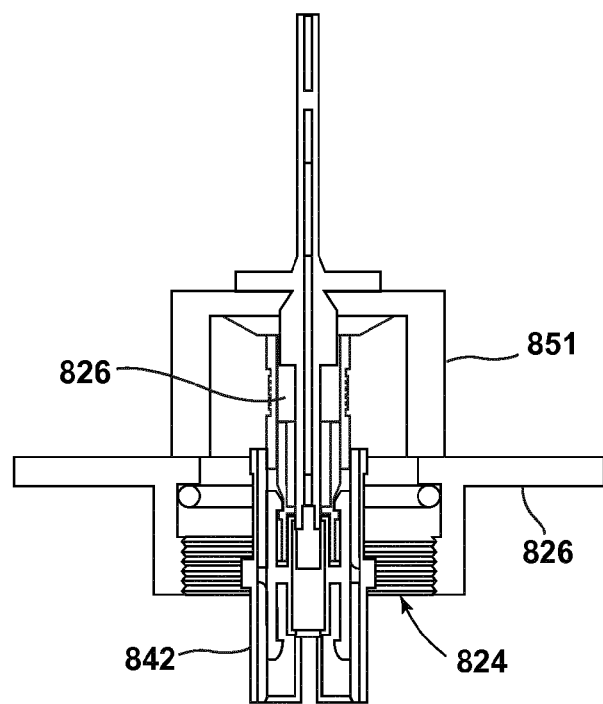
FIG. 31
FIG. 32

RUGGEDIZED FIBER OPTIC CONNECTORS AND CONNECTION SYSTEMS

CROSS-REFERENCE TO RELATED APPLICATIONS

This application is a Continuation of U.S. patent application Ser. No. 15/675,189, filed on Aug. 11, 2017, now U.S. Pat. No. 10,317,628, which is a Continuation of U.S. patent application Ser. No. 14/914,117, filed on Feb. 24, 2016, now U.S. Pat. No. 9,733,436, which is a National Stage of PCT/EP2014/068010, filed on Aug. 25, 2014, which claims the benefit of U.S. Provisional Application No. 61/869,672, filed on Aug. 24, 2013, U.S. Provisional Application No. 61/971,967, filed on Mar. 28, 2014, and U.S. Provisional Application No. 61/973,677, filed on Apr. 1, 2014, the disclosures of which are hereby incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to fiber optic connectors suitable for outside environmental use.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by U.S. Pat. Nos. 7,467,896; 7,744,288 and 8,556,520.

SUMMARY

Certain aspects of the present disclosure relate to a fiber optic connector system that efficiently provides effective compatibility with a number of different types of ruggedized fiber optic adapter configurations. In certain examples, the fiber optic connector system includes an elongate connector core including a front end defining a plug portion and a rear end defining a cable anchoring location. The fiber optic connector system also includes a first ruggedized exterior assembly configured to be mounted over the elongate connector core. The first ruggedized exterior assembly includes a first shroud configured to be mounted in a sealed relation over the elongate connector core. The first shroud has a forward end that includes a first keying arrangement for rotationally keying the first shroud relative to a first ruggedized fiber optic adapter. The first ruggedized exterior assembly also includes a first ruggedized fastening element for securing the first ruggedized exterior assembly to the first ruggedized fiber optic adapter. The fiber optic connector system also includes a second ruggedized exterior assembly configured to be mounted over the elongate connector core. The second ruggedized exterior assembly includes a second shroud configured to be mounted in sealed relation over the elongate connector core. The second shroud has a forward end that includes a second keying arrangement for rotationally keying the shroud relative to a second ruggedized fiber optic adapter. The first keying arrangement has a different keying configuration than the second keying arrangement. The second ruggedized exterior assembly also includes a second ruggedized fastening element for securing the second ruggedized exterior assembly to the second ruggedized fiber optic adapter. The first ruggedized fastening element has a different fastening configuration than the second ruggedized fastening element. The first ruggedized exterior assembly is usable in combination with the elongated connector core to make the fiber optic connector system compatible with the first ruggedized fiber optic adapter and the second ruggedized exterior assembly is usable in combination with the elongated connector core to make the system compatible with the second ruggedized fiber optic adapter. In this way, the elongate connector core can be factory mounted to a cable, and the cable assembly can be shipped in the field without any ruggedized exterior assemblies mounted thereon. In the field, a technician can install either the first ruggedized exterior assembly or the second ruggedized exterior assembly on the elongate connector core depending upon the style of ruggedized fiber optic adapter encountered. In this way, the system effectively provides compatibility with different styles of ruggedized fiber optic adapters. In other examples, the most commonly used style of ruggedized exterior assembly can be factory mounted on the elongate connector core and shipped to the field. In this example, in the event a non-compatible fiber optic adapter is encountered, the pre-installed ruggedized exterior assembly can readily be removed and replaced with a ruggedized exterior assembly that is compatible with the encountered ruggedized fiber optic adapter.

Aspects of the disclosure are directed to a fiber optic connector including a connector body having a distal end at least partially forming a plug portion of the fiber optic connector; a release sleeve mounted on the connector body and movable relative to the connector body along a lengthwise axis of the connector body; a first seal that extends around an exterior of the release sleeve; and a second seal that extends around an exterior of the connector body and provides sealing between the release sleeve and the connector body.

Other aspects of the disclosure are directed to a fiber optic connector including a connector body defining a plug portion at a distal end, a proximal portion at the proximal end, and an intermediate portion between the plug portion and the proximal portion; a seal that mounts around the intermediate portion; and a flexible latch integrally formed with the proximal portion.

Other aspects of the disclosure are directed to a fiber optic connection arrangement including structure defining a port, the structure including an exterior sleeve; a fiber optic adapter mounted at the port; a fiber optic connector configured to be received within a receptacle of the fiber optic adapter; and a protective structure that mounts over the fiber optic connector. The fiber optic connector includes a connector body defining a plug portion and a boot attached the connector body. The protective structure includes a distal end that attaches to the exterior sleeve of the port and a proximal end through which a cable connected to the fiber optic connector is routed.

Other aspects of the disclosure are directed to a fiber optic connection arrangement including a core connector assembly; a protective outer shell; and a port fastener. The core connector assembly includes a sealing and cable attachment unit and a connector body coupled to the sealing and cable attachment unit. The sealing and cable attachment unit includes a seal. The protective outer shell is configured to couple to the sealing and cable attachment unit of the core connector assembly. The protective outer shell engages the seal when the protective outer shell is coupled to the core connector assembly. The port fastener is configured to couple the protective outer shroud to a port.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIGS. 28-31 show another fiber optic connection system in accordance with the principles of the present disclosure;

FIG. 32 shows an alternative embodiment where a stop is provided that prevents the first fiber optic connector from being extended from the port and ensures that the first fiber optic connector remains seated against the spring;

DETAILED DESCRIPTION

The expansion of fiber optic networks toward the premises has driven the demand for enhanced fiber optic connectors suitable for outside environmental uses. For example, in a given fiber optic network, outside fiber optic connectors are used to connect fiber optic cables to structures such as drop terminals (i.e., multi-service terminals), optical network terminals (ONTs), breakout locations on fiber optic cables, fiber distribution hubs, splice closures, pedestals, or other structures. Effective use of fiber optic connectors in outside environments requires the fiber optic connectors to be sealed against the environment and to have robust designs that can withstand relatively large temperature variations, large pulling loads, and significant side loading. It is also desirable for such connectors to be relatively easy to insert and remove from a port in a structure of the type described above. The present disclosure describes various connectors having rugged, robust designs that are environmentally sealed and that are relatively easy to install and uninstall in the field.

Figure 1:
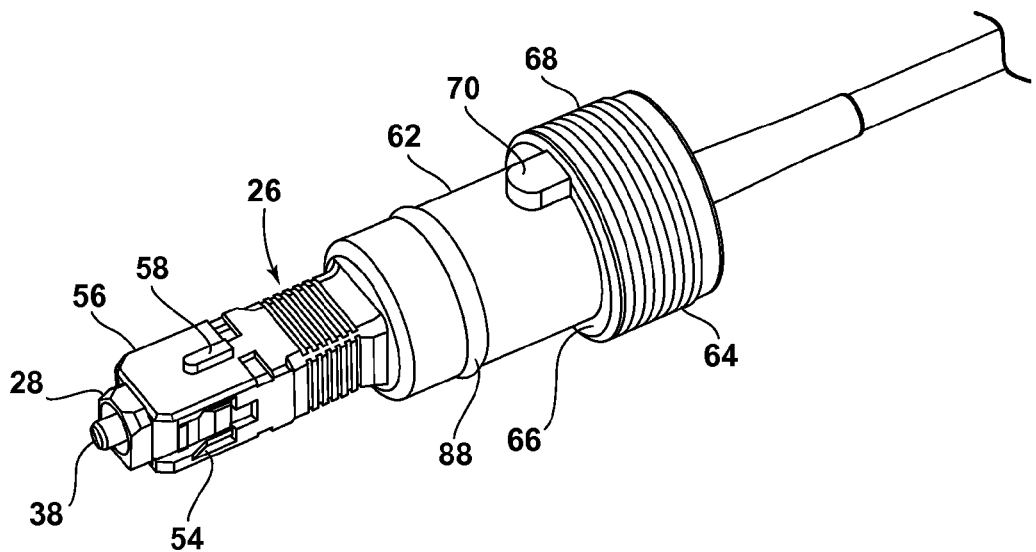
FIG. 1 is a perspective view of a fiber optic connector in accordance with the principles of the present disclosure.

FIG. 1 shows a fiber optic connector 20 in accordance with the principles of the present disclosure. Generally, the fiber optic connector 20 includes a connector body 22 (see FIG. 3) having a length that extends along a lengthwise axis 24. The fiber optic connector 20 also includes a release sleeve 26 (see FIG. 2) that mounts over the connector body 22 and has a limited range of slidable movement relative to the connector body 22 along the lengthwise axis 24.

Figure 3:
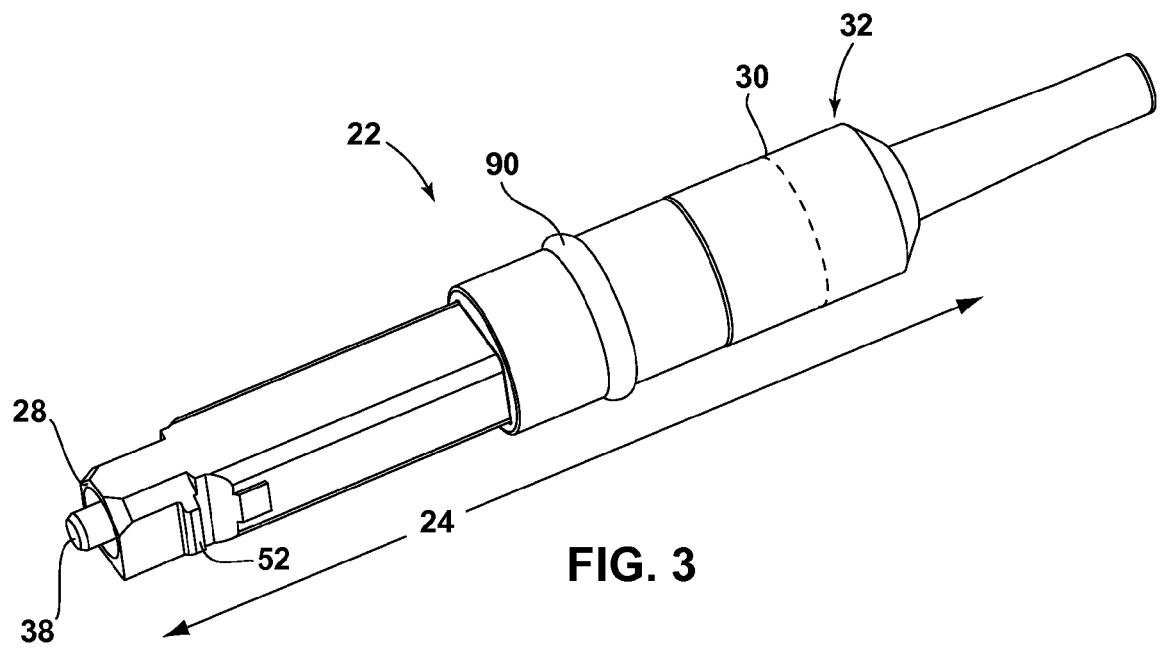
FIG. 3 is a perspective view of a connector body of the fiber optic connector of FIG. 1.

Referring to FIG. 3, the connector body 22 includes a distal end 28 and a proximal end 30. A boot 32 is mounted adjacent the proximal end 30 of the connector body 22. The boot 32 is adapted to receive and provide strain relief to a fiber optic cable 34 to which the fiber optic connector 20 is secured. The fiber optic cable 34 includes an optical fiber 36 that is routed through the connector body 22. An end of the optical fiber 36 is supported within a ferrule 38 accessible at the distal end 28 of the connector body 22. The ferrule 38 can be spring biased in a distal direction relative to the connector body 22 by a spring 40.

Figure 4:
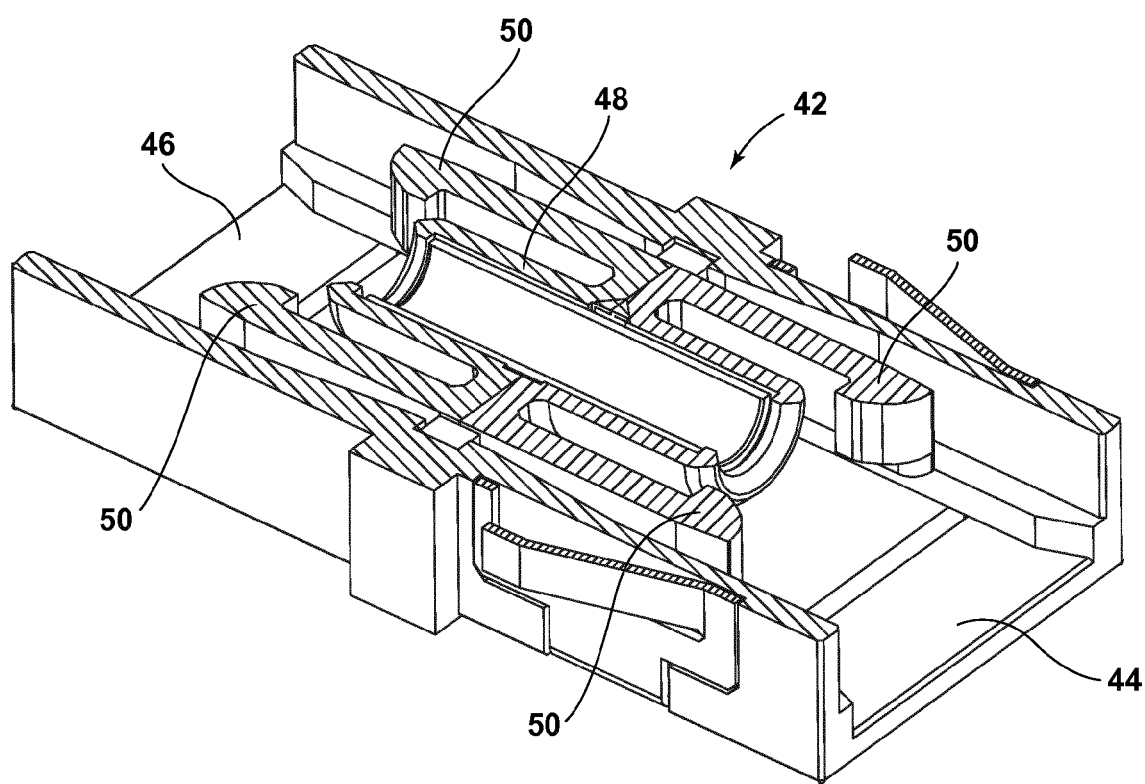
FIG. 4 is a cross-sectional view of a fiber optic adapter configured to receive the fiber optic connector of FIG. 1.

As described above, the distal end 28 of the connector body 22 defines a plug portion of the fiber optic connector 20. The plug portion is adapted to be received within a fiber optic adapter 42 of the type shown at FIG. 4. The fiber optic adapter 42 includes first and second receptacles 44, 46 adapted to receive two fiber optic connectors desired to be optically coupled together. The fiber optic adapter 42 includes an alignment sleeve 48 for receiving and coaxially aligning the ferrules of the two fiber optic connectors desired to be coupled together. The fiber optic adapter 42 also includes latches 50 corresponding to each of the receptacles 46, 48. The latches 50 are adapted to mechanically retain the fiber optic connectors within the receptacles 46, 48.

Figure 2:
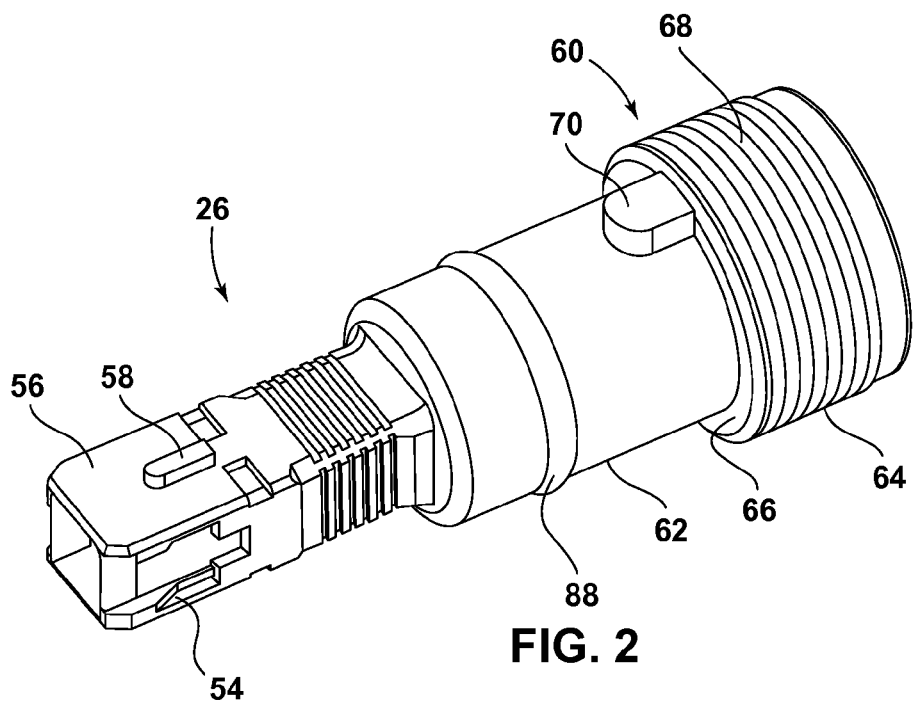
FIG. 2 is a perspective view of a release sleeve of the fiber optic connector of FIG. 1.

Referring back to FIG. 3, the connector body 22 includes exterior shoulders 52 on opposite sides of the connector body 22. When the plug portion of the connector body 22 is inserted within the first receptacle 44 of the fiber optic adapter 42, the ferrule 38 fits within the alignment sleeve 48 of the fiber optic adapter 42 and the latches 50 snap past and latch against the exterior shoulders 52 to prevent the connector body 22 from being removed from the first receptacle 44. The release sleeve 26 mounts over the connector body 22 and is provided for disengaging the latches 50 from the exterior shoulders 52 when it is desired to remove the fiber optic connector 20 from the first receptacle 44. For example, as shown at FIG. 2, the release sleeve 26 includes ramp surfaces 54 configured to engage the latches 50. By pulling the release sleeve 26 proximally relative to the connector body 22 when the fiber optic connector 20 is mounted within the first receptacle 44, the ramp surfaces 54 of the release sleeve 26 are caused to engage the latches 50 and to push the latches 50 outwardly away from the exterior shoulders 52 of the connector body 22. Pushing the latches 50 away from the exterior shoulders 52 effectively releases the fiber optic connector 20 from the latches 50, thereby allowing the fiber optic connector 20 to be withdrawn from the first receptacle 44.

Referring to FIG. 2, the release sleeve 26 includes a distal portion 56 configured to fit within the first receptacle 44 of the fiber optic adapter 42. The ramp surfaces 54 are provided at opposite sides of the distal portion 56. A distal key 58 fits within a corresponding slot provided at the first receptacle 44. The release sleeve 26 also includes a proximal portion 60 that extends proximally away from the distal portion 56. The proximal portion 60 forms an elongated handle that extends proximally beyond the proximal end 30 of the connector body 22. In one example, the proximal portion 60 is generally cylindrical and includes a smaller diameter portion 62 separated from a larger diameter portion 64 by a radial step 66. The larger diameter portion 64 includes a proximal gripping portion 68. The release sleeve 26 also includes a proximal key 70 that is axially aligned with the distal key 58 and that extends in a distal direction from the radial step 66.

Figure 5:
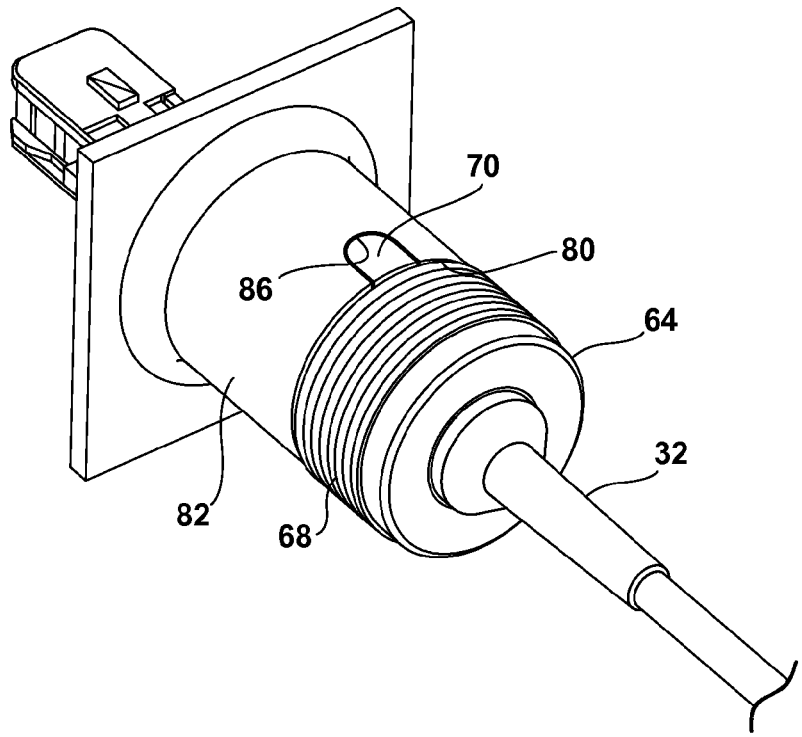
FIG. 5 is a perspective view showing the fiber optic connector of FIG. 1 inserted within a port of a closure, panel or other structure.
Figure 6:
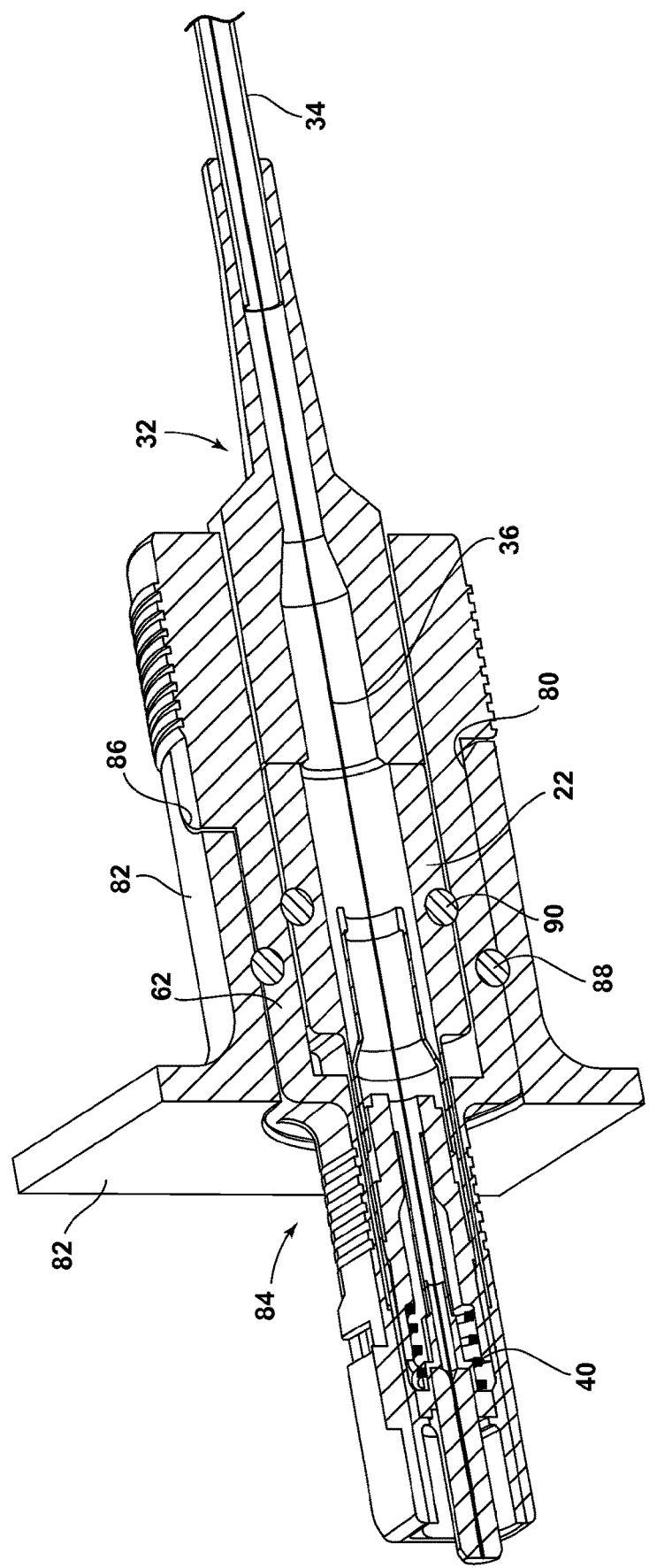
FIG. 6 is a cross-sectional view showing the fiber optic connector of FIG. 1 mounted within the port of FIG. 5.

Referring to FIG. 5, the fiber optic connector 20 is configured to be inserted within a port 80 defined by a structure 82 such as a terminal, a closure, an enclosure, a panel, a housing or other telecommunications component. In certain examples, the structure 82 is an environmentally sealed closure. While not depicted in FIGS. 5 and 6, a fiber optic adapter such as the fiber optic adapter 42 can be mounted at an interior end 84 of the port 80 and can be configured for receiving the plug end of the fiber optic connector 20 when the fiber optic connector 20 is inserted within the port 80. FIGS. 5 and 6 show the fiber optic connector 20 fully inserted within the port 80. The port 80 includes an exterior notch 86 at an exterior end 88 of the port 80. The exterior notch 86 is adapted for receiving the proximal key 70 when the fiber optic connector 20 is fully inserted within the port 80. In this way, the notch 86 and the key 70 ensure that the fiber optic connector 20 is inserted into the port 80 at the appropriate rotational orientation.

Referring to FIG. 6, the fiber optic connector 20 includes a sealing arrangement for preventing the intrusion of moisture or other material into the structure 82 when the fiber optic connector 20 is inserted within the port 80. In one example, the sealing arrangement includes an outer circumferential seal 88 (e.g., an O-ring seal) mounted in a circumferential groove defined within the exterior surface of the smaller diameter portion 62 of the proximal portion 60 of the release sleeve 26. It will be appreciated that the port 80 and the smaller diameter portion 62 are both generally cylindrical in shape so as to facilitate providing an effective seal with an O-ring type seal. Still referring to FIG. 6, the sealing arrangement also includes a seal 90 between the release sleeve 26 and the connector body 22. The seal 90 is defined between an inner surface of the release sleeve 26 and an outer surface of the connector body 22. In an example, the seal 90 is an O-ring seal shown mounted within a circumferential groove defined within a cylindrical portion of the connector body 22 located adjacent to the proximal end 30 of the connector body 22. The seal 90 engages an inner surface of the smaller diameter portion 62 of the release sleeve 26. The outer portion of the connector body 22 and the inner surface of the release sleeve 26 are generally cylindrical adjacent the seal 90 so as to enhance effective sealing with an O-ring type seal.

In use of the fiber optic connector 20, the fiber optic connector 20 is inserted into the port 80 such that the distal end of the fiber optic connector is received within the first receptacle 44 of a fiber optic adapter secured at the interior end 84 of the port 80. When the fiber optic connector 20 is inserted within the port 80, the latches 50 of the fiber optic adapter 40 engage the exterior shoulders 52 to secure the optic connector 20 within the port 80. To remove the fiber optic connector 20 from the port 80, the release sleeve 26 is grasped at the larger diameter portion 64 and pulled in a proximal direction. As the release sleeve 26 is pulled in a proximal direction relative to the connector body 22, the ramp surfaces 54 push the latches 50 out of engagement with the exterior shoulders 52 thereby allowing the fiber optic connector 20 to be withdrawn from the port 80.

Figure 7:
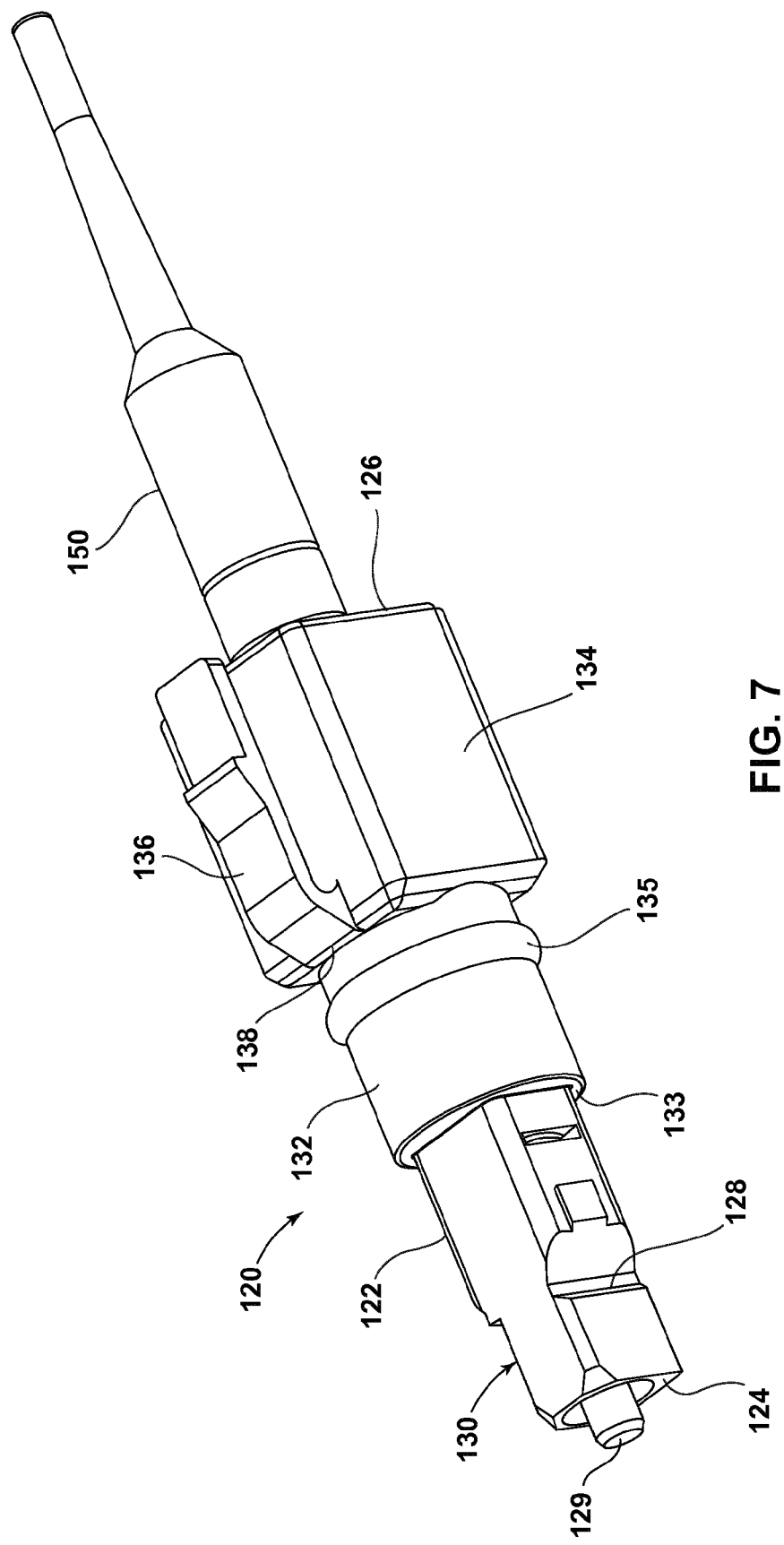
FIG. 7 is a perspective view of another fiber optic connector in accordance with the principles of the present disclosure.
Figure 8:
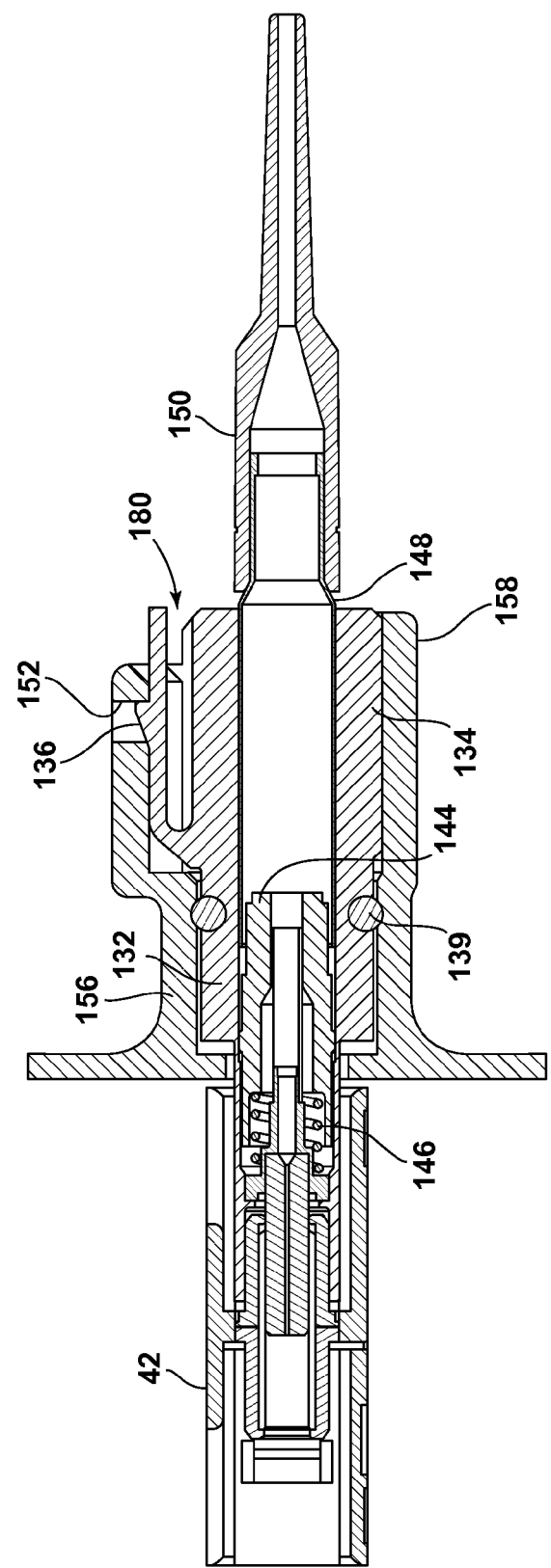
FIG. 8 show the fiber optic connector of FIG. 7 mounted within a port of a closure, panel or other structure.

FIGS. 7 and 8 show another fiber optic connector 120 in accordance with the principles of the present disclosure. Similar to the previous example, the fiber optic connector 120 is adapted to be received within a fiber optic adapter 42 secured at the interior end of a port 180 defined by a structure of the type previously described. The fiber optic connector 120 includes a connector body 122 having a distal end 124 and a proximal end 126. The distal end 124 forms a plug end of the fiber optic connector 120. A ferrule 129 supporting an optical fiber of a fiber optic cable is accessible at the plug end of the fiber optic connector 120. Ramped notches 128 are provided at opposite sides of the connector body 122 adjacent the distal end 124. When the plug end of the fiber optic connector 120 is inserted within the fiber optic adapter 42, the latches 50 snap within the notches 128 to provide for light retention of the fiber optic connector 120 within the port 180. The configuration of the ramped notches 128 allows the connector body 122 to be pulled from the latches 50 without the need of a release sleeve.

As described above, the connector body 122 includes a plug portion 130 at the distal end 124. The ramped notches 128 are provided at opposite sides of the plug portion 130 and the ferrule is accessible at the distal-most end of the plug portion 130. The connector body 122 also includes an intermediate section 132 positioned at a proximal end of the plug portion 130. A radial shoulder 133 is defined between the plug portion 130 and the intermediate portion 132. The intermediate portion 132 is generally cylindrical in shape and defines a circumferential groove in which a sealing member, such as an O-ring 135, is mounted. The connector body 122 also includes a proximal portion 134 positioned adjacent to the proximal end 126. The proximal portion 134 has a generally rectangular transverse cross-sectional shape. The connector body 122 also includes a resilient latch 136 having a base end 138 integrally formed with the proximal portion 134.

Referring to FIG. 8, the fiber optic connector 120 further includes an inner hub 144 that supports a spring 146 used to bias the ferrule in a distal direction. The hub 144 mounts within the connector body 122. A rear extension 148 can attach to the hub 144 and extend proximally from the proximal end 126 of the connector body 122. A boot or heat shrink 150 can be mounted at the proximal end of the rear extension 148. As with the previous example, a fiber optic cable can be connected to the fiber optic connector 120 with a fiber of the fiber optic cable being supported at the ferrule. The heat shrink or boot 150 can be used to provide strain relief at the interface between the cable and the fiber optic connector 120 and can also provide sealing about the rear extension 148. In certain embodiments, a seal can also be provided between the exterior of the rear extension 148 and the interior of the connector body 122.

Referring again to FIG. 8, the fiber optic connector 120 can be inserted into the port such that the plug portion 130 is received within the receptacle 44 of the fiber optic adapter 42. As so positioned, the latches 50 of the fiber optic adapter 42 fit within the ramped notches 128. Additionally, the latch 136 snaps within a catch 152 defined by the port 180. The port 180 includes a generally rectangular portion 156 that receives the intermediate portion 132 of the connector body 122 and a cylindrical portion 158 that receives the proximal portion 134 of the connector body 122. The intermediate portion 132 can define a circumferential groove in which an O-ring seal 139 is positioned. The O-ring seal 139 can provide a seal between the connector body 122 and the cylindrical portion of the port 180. To withdraw the fiber optic connector 120 from the port 180, the latch 136 is depressed, thereby disengaging the latch 136 from the catch 152, thereby allowing the fiber optic connector 120 to be axially pulled from the port 180.

Figure 9:
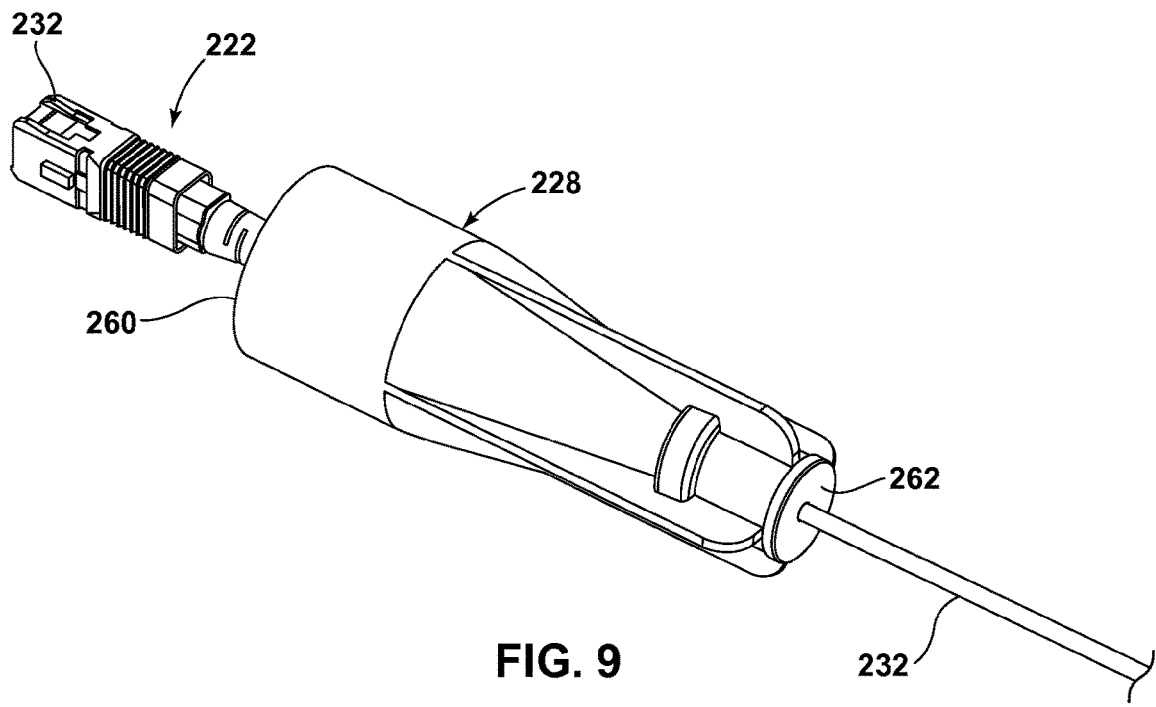
FIG. 9 is a perspective view of another connector arrangement in accordance with the principles of the present disclosure.
Figure 10:
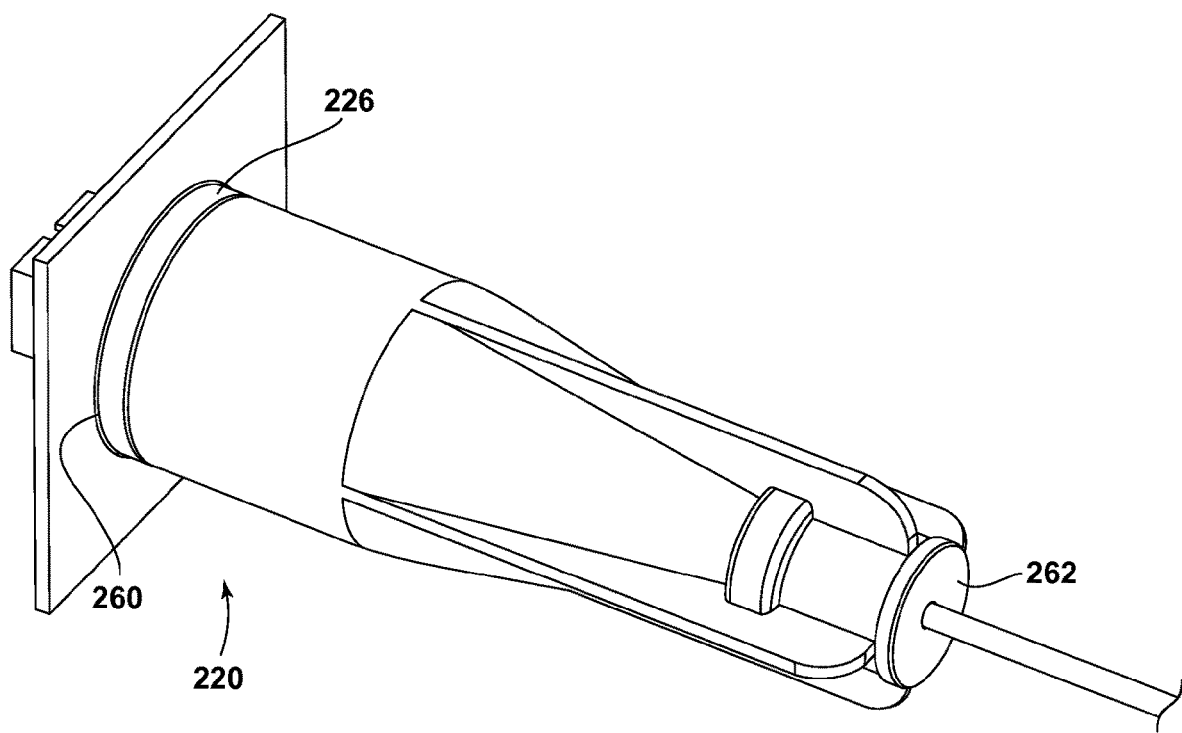
FIG. 10 shows the connector arrangement of FIG. 9 secured at a port of a closure, panel or other structure.
Figure 11:
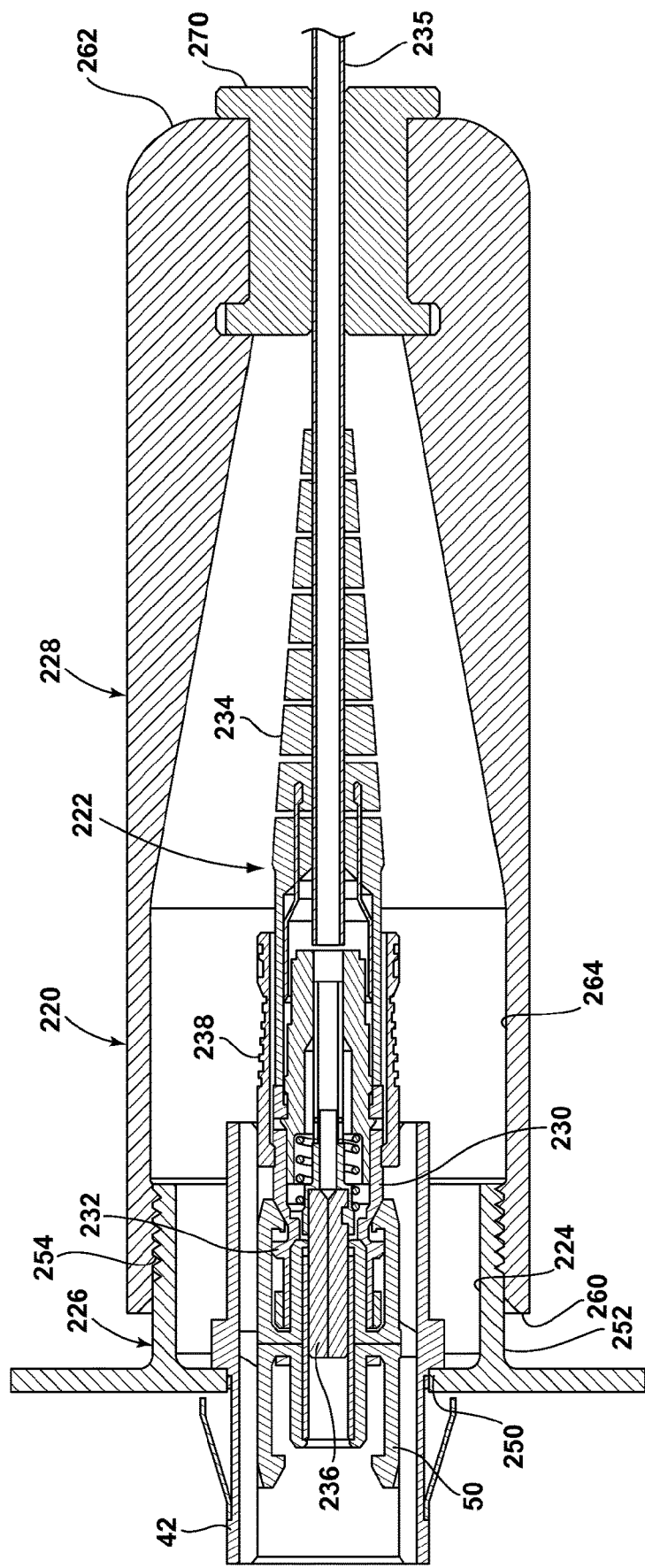
FIG. 11 is a cross-sectional view showing the connector and port arrangement of FIG. 10.

FIGS. 9-11 show a connector arrangement 220 in accordance with the principles of the present disclosure. The connector arrangement 220 includes a fiber optic connector 222, a port 224 defined within a closure 226 or other structure, a fiber optic adapter 42 mounted at the port 224 and configured for receiving the fiber optic connector 222, and a protective shell 228 that mounts over the port 224 and encloses the fiber optic connector 224. Referring to FIG. 11, the fiber optic connector 222 is depicted as an SC-type fiber optic connector. The fiber optic connector 222 includes a connector body 230 having shoulders 232 for engaging the latches 50 of the fiber optic adapter 42. The fiber optic connector 222 mounts at the end of a fiber optic cable 235. A flexible strain-relief boot 234 provides strain relief at the interface between the fiber optic cable 235 and the connector body 230. An optical fiber of the fiber optic cable 235 is supported within a ferrule 236 accessible at the distal end of the fiber optic connector 222. A release sleeve 238 mounts over the connector body 230. The release sleeve 238 is axially moved relative to the connector body and includes ramp structures for disengaging the latches 50 from the shoulders of the connector body 230 when it is desired to remove the fiber optic connector 222 from the fiber optic adapter 42.

The port 224 includes an opening 250 in which the fiber optic adapter 42 is mounted. The port 224 also includes an exterior sleeve 252 that is generally cylindrical and that surrounds the outer receptacle of the adapter 42. In the depicted embodiment, the sleeve 252 includes external threads 254.

The protective shell 228 is configured for ruggedizing, protecting, and sealing the connector-to-adapter interface at the port 224. The protective shell includes a distal end 260 and a proximal end 262. The protective shell 228 also includes an interior cavity 264 sized to receive the fiber optic connector 220 therein. The distal end 260 is open and substantially cylindrical.

In one example, the protective shell 228 can have a relatively rigid construction made of a hard, plastic material such as polymide or other materials. The distal end 260 can include internal threads that mate with the exterior threads 254 of the sleeve 252. A seal (e.g., an O-ring seal) can also be provided at the distal end 260 adjacent the threads. The proximal end 262 can support a sealing plug 270 that provides a seal between the jacket of the fiber optic cable 235 and the protective shell 228. By threading the protective shell 228 onto the sleeve 252, the fiber optic connector 222 and the fiber optic adapter 42 are effectively protected from the environment.

Figure 12:
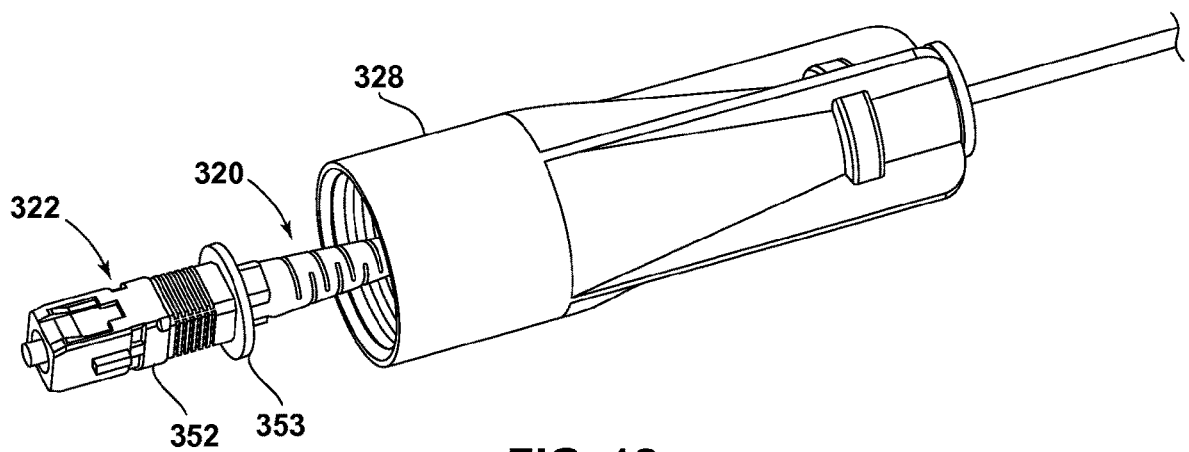
FIG. 12 illustrates a further connector arrangement in accordance with the principles of the present disclosure.
Figure 13:
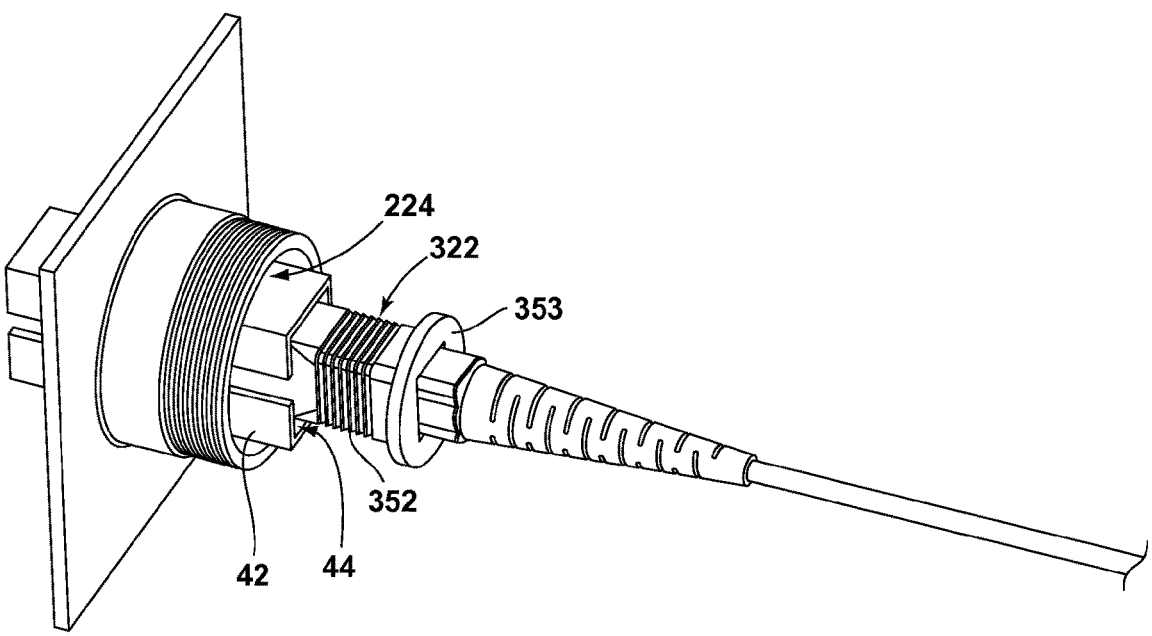
FIG. 13 shows the connector arrangement of FIG. 12 with a connector of the connector arrangement inserted within a port of a closure, panel or other structure.
Figure 14:
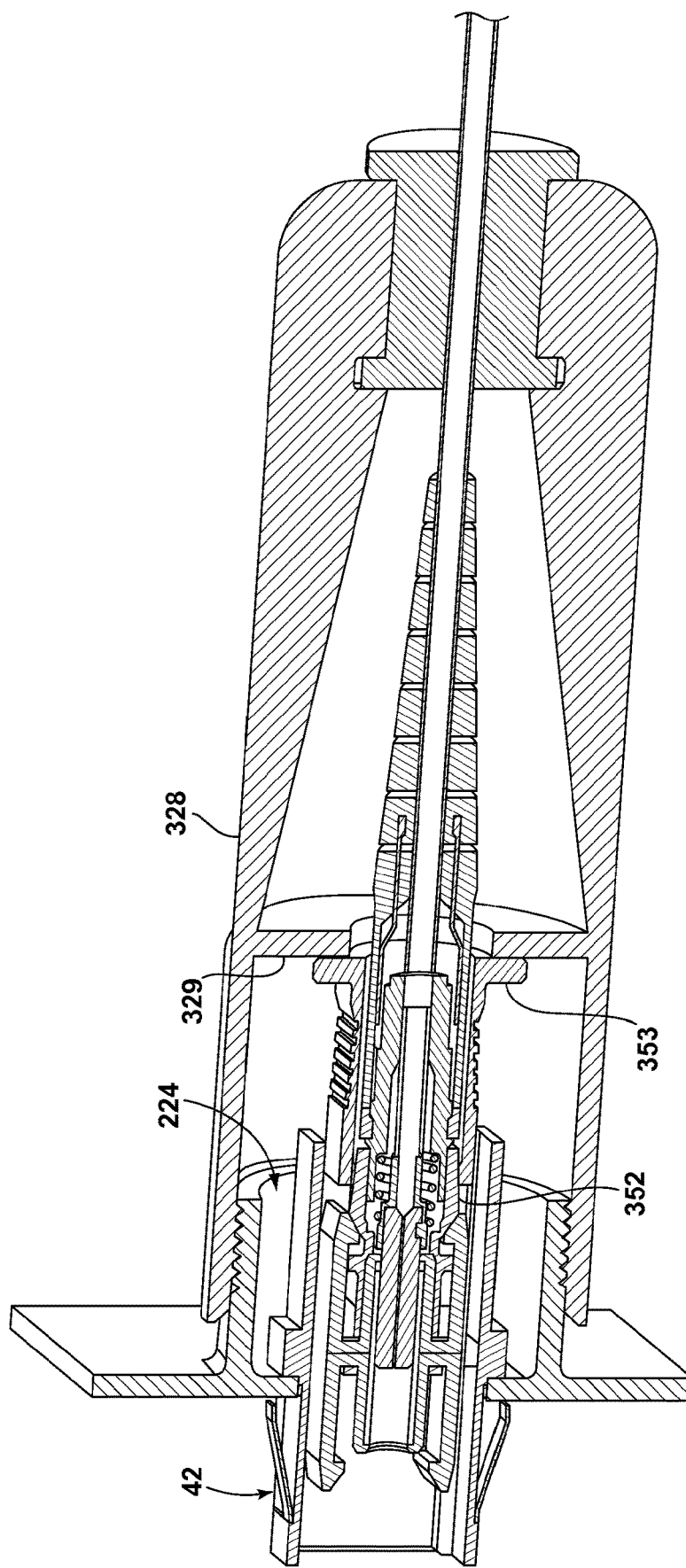
FIG. 14 is a cross-sectional view of the connector arrangement of FIG. 12 secured at the port of FIG. 13.

Referring to FIGS. 12-14, a further connector arrangement 320 is depicted. The connector arrangement 320 has the same general configuration as the connector arrangement 220 except the connector arrangement 320 has a modified release sleeve 352 with a proximal flange 353 and also has a modified protective shell 328 having an internal retention member 329 (FIG. 14). When the protective shell 328 is threaded onto the sleeve 352, the retention member 329 abuts against the end flange 353 of the release sleeve 352 to provide additional retention force for retaining the fiber optic connector 322 within the port 224.

Figure 15:
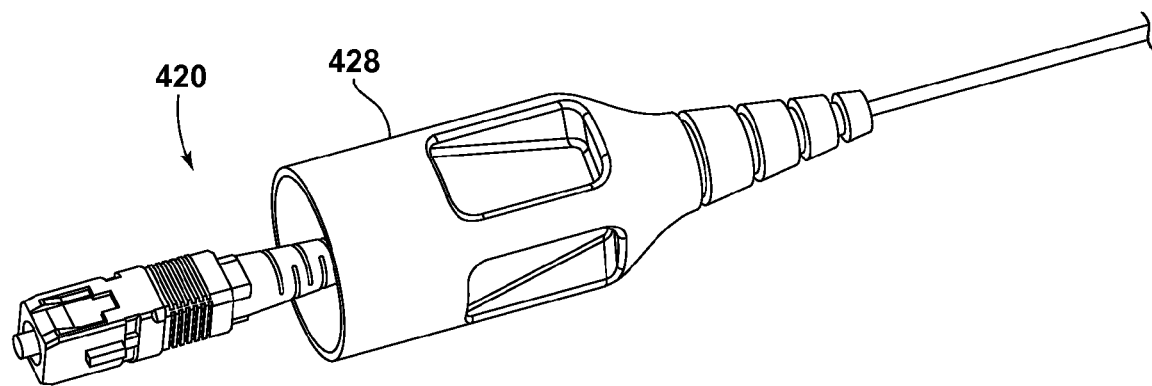
FIG. 15 illustrates yet another connector arrangement in accordance with the principles of the present disclosure.
Figure 16:
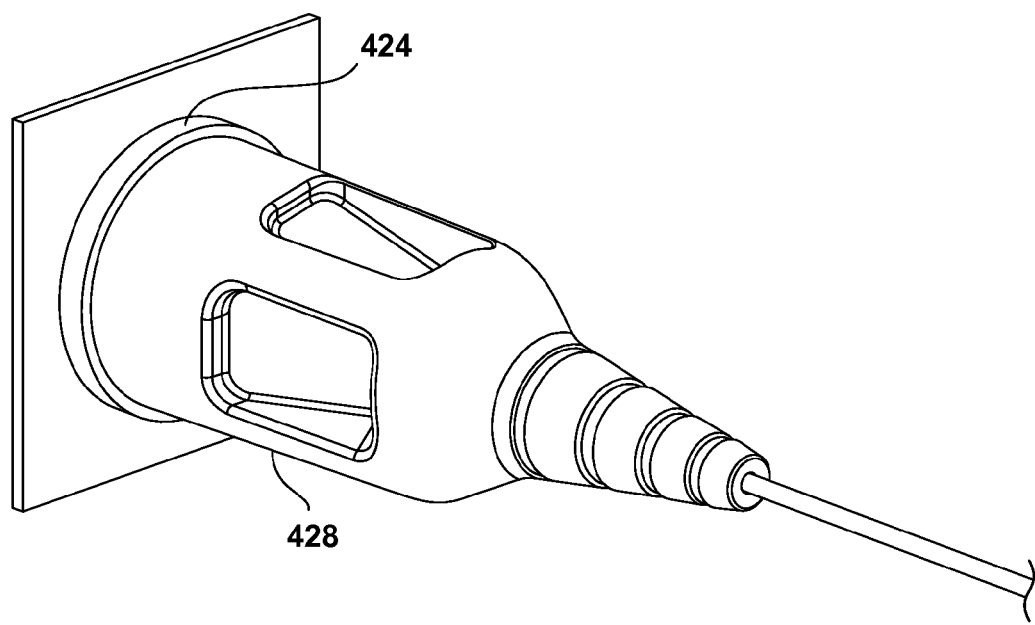
FIG. 16 shows the connector arrangement of FIG. 15 secured at a port of a closure, panel or other structure.
Figure 17:
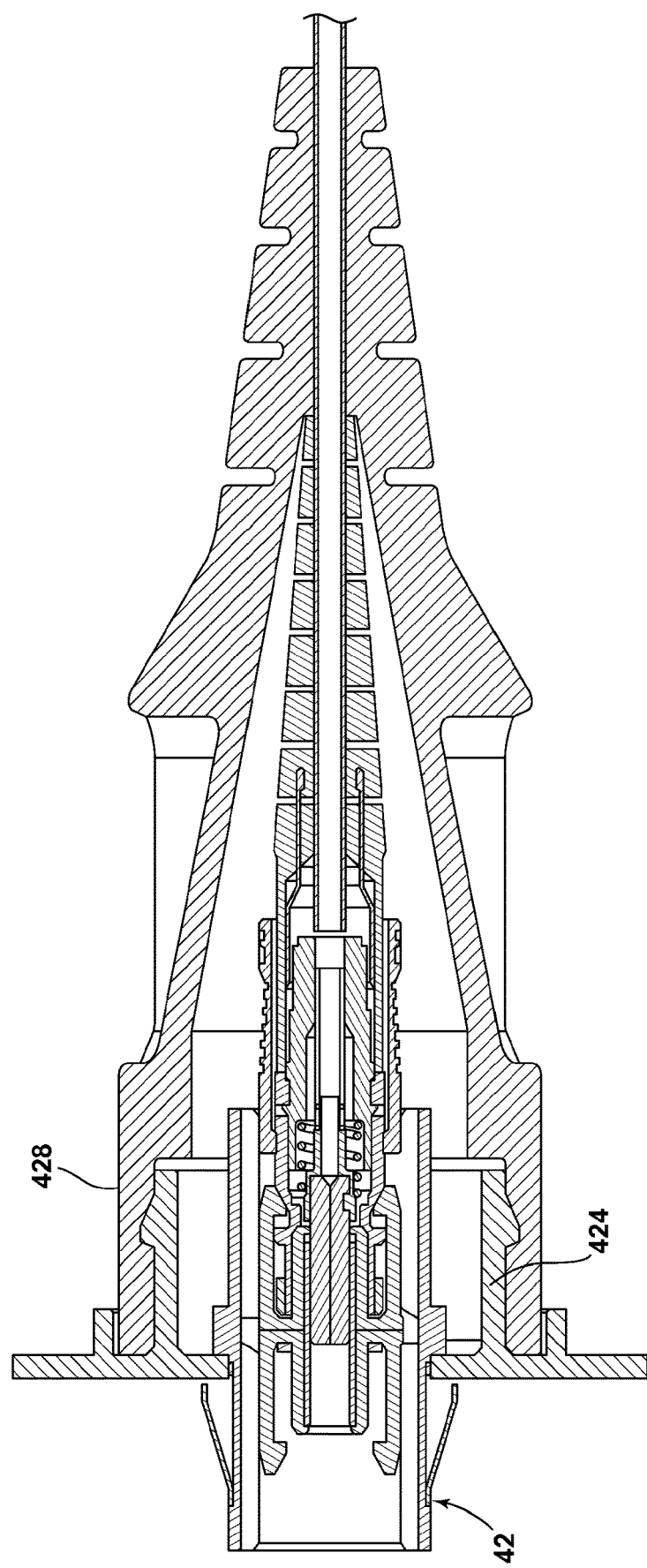
FIG. 17 is a cross-sectional view of the port and connector arrangement of FIG. 16.

FIGS. 15-17 show still another connector arrangement 420 in accordance with the principles of the present disclosure. The connector arrangement 420 has the same basic configuration as the connector arrangement 220 except the protective shell 228 has been replaced with a protective boot 428. The protective boot 428 can have a flexible, bendable construction similar to a standard boot on a fiber optic connector. The protective boot 428 includes an internal cavity configured for receiving the fiber optic connector 222. A distal end of the protective boot 428 connects to a port structure 424 via a snap-fit connection. A proximal end of the protective boot 428 can have a segmented, tapered configuration that reduces in cross-sectional shape as the tapered structure extends in a proximal direction. The boot of the fiber optic connector can fit at least partially within the tapered portion of the protective boot 428.

FIGS. 18-23 and 28 illustrate convertible connector arrangements that enable different ruggedization features to be added to a core connector assembly to fit with the particular interface provided at a given port. In each of the convertible connector arrangements, a connector body 530, 830 is mounted to a sealing and cable attachment unit 570, 570A, 876, which can also be referred to as a universal connector mount. The connector body 530, 830 and sealing and cable attachment unit 570, 570A, 876 together form the core connector assembly. As will be shown, various shrouds 528, 860 and port fasteners 553, 870 can be added to the core connector assembly to enable the core connector assembly to fit at various ports 524, 824. In some example cases, various fasteners 602, 884 couple the shrouds 528, 860 to the sealing and cable attachment units 570, 876. In other example cases, the shroud 528 fastens directly to the sealing and cable attachment unit 570A (e.g., by a snap-fit connection).

Figure 19:
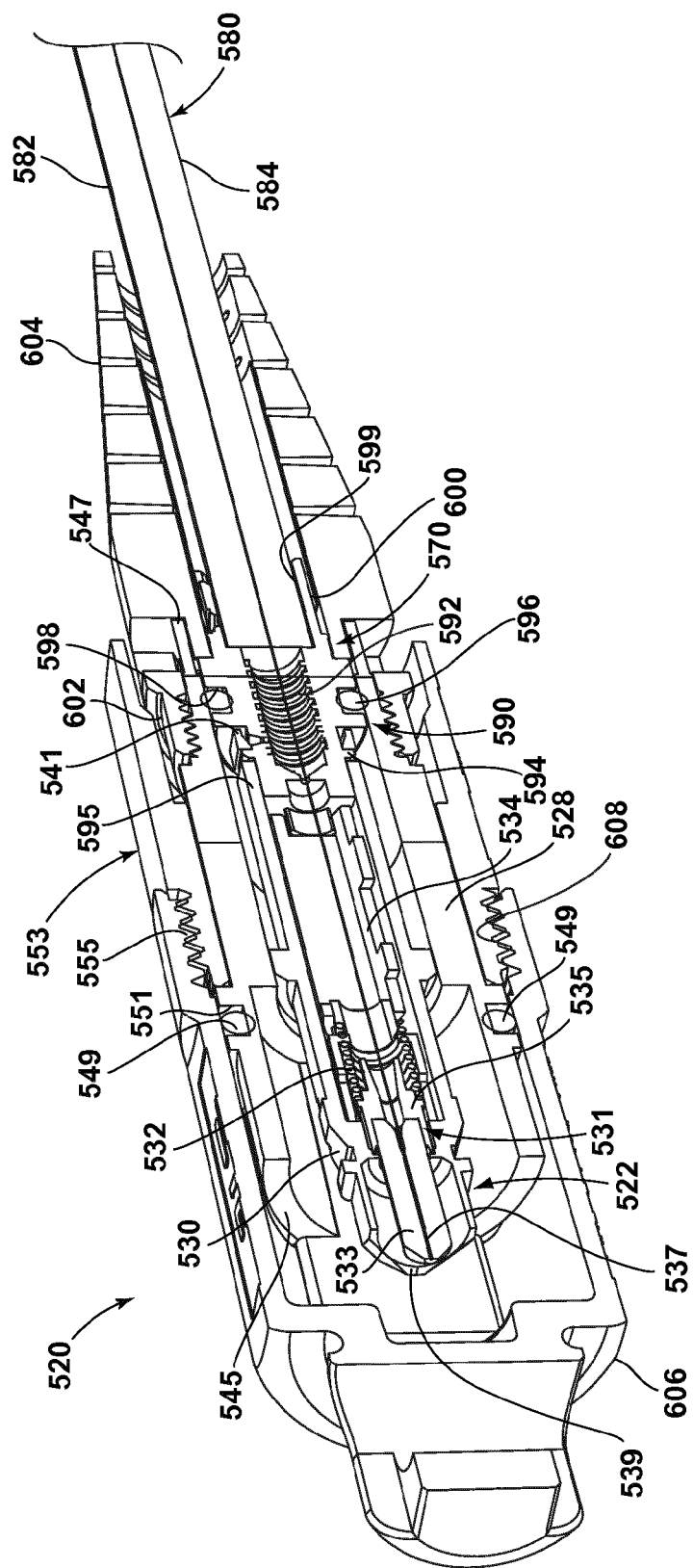

As shown in FIG. 19, a ferrule assembly 531 and a fiber guide 534 are mounted within the connector body 530. (The corresponding features also are visible in FIG. 28.) The ferrule assembly 531 includes a ferrule 533 mounted to a hub 535. The ferrule 533 includes a central passage 537 for receiving an optical fiber. The ferrule assembly 531 further includes a spring 532 for biasing the hub 535 and the ferrule 533 in a forward direction relative to the connector body 530. A front of the fiber guide 534 forms a spring stop against which one end the spring 532 seats. The other end of the spring 532 abuts against a flange on the hub 535 to bias the hub 535 forward relative to the fiber guide 534. The hub 535 is held between the spring 532 and the connector body 530.

The connector body 530, 830 includes a front end 539 and a rear end 541. The ferrule assembly 531 mounts within the connector body 530 adjacent the front end 539. As so mounted, the ferrule 533 is accessible at the front end 539 of the connector body 530. The front end 539 of the connector body 530, 830 forms a plug configured to be received within a corresponding fiber optic adapter 542. The sealing and cable attachment unit 570, 570A, 876 extends through the rear end 541 of the connector body 530, 830 and engages the fiber guide 534. In certain examples, the connector body 530, 830 can have a form factor consistent with an SC-connector. However, other types of connector bodies can be utilized. For example, as shown at FIG. 31, the fiber optic connectors 530, 830 can have modified shoulders that are angled or tapered so as to be removable from the fiber optic adapter 842 without the use of a release sleeve. Thus, in the depicted example of FIG. 31, the fiber optic connector 828 does not have a release sleeve.

Figure 18:
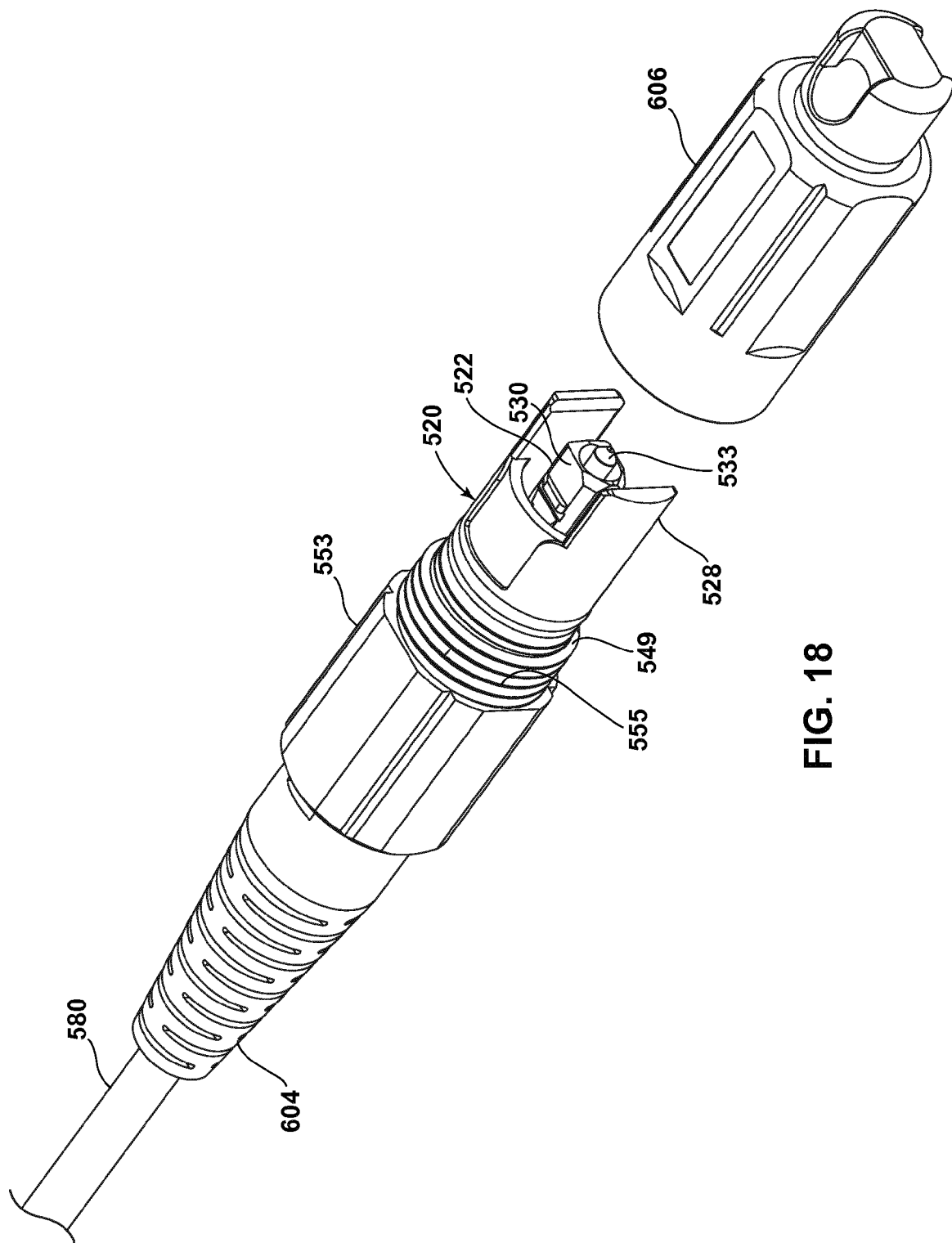
FIGS. 18-20 show another connector arrangement 520 in accordance with the principles of the present disclosure.
Figure 20:
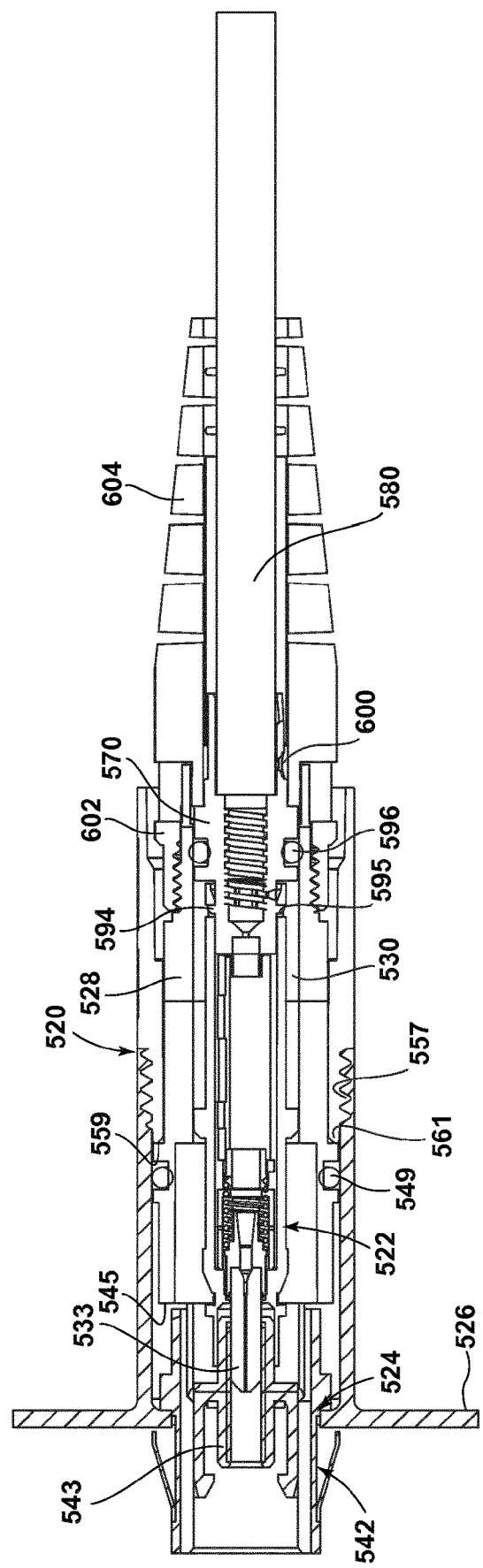

FIGS. 18-20 show a connector arrangement 520 in accordance with the principles of the present disclosure. The connector arrangement 520 includes a fiber optic connector 522 having a connector body 530 and a sealing and cable attachment unit 570. As shown at FIG. 20, the fiber optic adapter 542 can include an alignment sleeve 543 configured for receiving the ferrule 533. In certain examples, the fiber optic adapter 542 can be mounted at a port 524 within a closure 526 or other structure. In the depicted example, the fiber optic adapter 542 does not have latches at the port 524 for engaging the connector body 530. Additionally, the connector arrangement 520 does not include a release sleeve that mounts over the connector body 530.

Referring still to FIGS. 18-20, the connector arrangement 520 further includes an example protective shroud or shell 528 that mounts over the connector body 530. The protective shell 528 mounts to the sealing and cable attachment unit 570 of the connector 522. The protective shell 528 can include a front end 545 and a rear end 547. The front end 545 can include a key or keying arrangement for providing rotational alignment between the protective shell 528 and the port 524. In certain examples, an environmental seal can be provided between the protective shell 528 and the closure 526 to provide sealing of the port 524. While the sealing can be provided in a variety of ways, in the depicted example, sealing can be provided by a seal 549 (e.g., an O-ring seal) that mounts about an exterior of the protective shell 528 near the front end 545. In the depicted example, the seal 549 is a radial seal mounted within a circumferential groove 551 defined at the exterior of the protective shell 528. When the protective shell 528 is inserted within the port 524 of the closure 526, the seal 549 is radially compressed between the exterior surface of the protective shell 528 and a circumferential sealing surface defined by the closure 526 at the port 524. In other examples, axial seals, face seals, or other types of seals can be used. Moreover, in still other examples, the protective shell 528 can fit over a sleeve provided at the port 524 and sealing can be provided between the interior of the protective shell and the exterior of the sleeve. In certain examples, a retaining element or fastener can be used to secure the protective shell 528 within the port 524. In one example, the retaining element can include fastening structures such as threads or bayonet members that interlock with the corresponding fastening structures provided at the port 524. In the depicted embodiment, a retaining structure in the form of a fastening nut 553 is used to retain the protective shell 528 within the port 524. The fastening nut 553 includes external threads 555 that mate with corresponding internal threads 557 of the port 524 to retain the protective shell 528 within the port 524. The fastening nut 553 includes an engagement portion 559 (e.g., a front end) that engages a corresponding engagement portion 561 (i.e., a shoulder) of the protective shell 528 so as to retain the protective shell 528 within the port 524 (see FIG. 20). The fastening nut 553 is positioned over the protective shell 528 and is free to rotate about a central axis of the protective shell 528 and is also free to move axially relative to the protective shell 528.

As indicated above, the fiber optic connector 522 mounts within the protective shell 528. The connector assembly 520 further includes a sealing and cable attachment unit 570 positioned at the rear end 547 of the connector body 530. In one example, the sealing and cable attachment unit 570 attaches at the rear end 541 of the connector body 530. For example, the sealing end cable attachment unit 570 can attach to the rear end 541 of the connector body 530 by a mechanical interface such as a snap-fit connection, a threaded connection, a bayonet type connection or other type of connection. As depicted, the sealing end cable attachment unit 570 is secured to the connector body 530 by a snap-fit connection. In one example, the sealing and cable attachment unit 570 is coupled to the connector body 530 by inserting the sealing and cable attachment unit 570 through the rear end 547 of the shell 528 and attaching the sealing and cable attachment unit 570 to the rear end 541 of the connector body 530.

In certain examples, a fiber optic cable 580 can be secured to the sealing and cable attachment unit 570. An optical fiber 582 of the fiber optic cable can extend through the sealing and cable attachment unit 570 through the connector body 530 to the ferrule 533. In certain examples, adhesive can be used to secure the optical fiber 582 within the ferrule 533. The fiber optic cable 580 can also include an outer jacket 584 and a strength element (e.g., a reinforcing component such as Aramid yarn, fiber reinforce epoxy rods, fiberglass strands, etc.). In certain examples, the jacket 584 and the reinforcing structure can be secured to the sealing and cable attachment unit 570. For example, the jacket and/or the reinforcing structure can be crimped, mechanically bonded or otherwise attached to the sealing and cable attachment unit 570. In certain examples, a structure such as a heat shrink sleeve can be used to provide sealing between the jacket 584 and the sealing and cable attachment unit 570.

The sealing and cable attachment unit 570 includes a rear body 590 defining a central passage 592 for receiving the optical fiber 582. In certain examples, the rear body 590, protective shell 528 and the connector body 530 can all have a relatively rigid construction made of a hard, plastic material such as polymide or other materials. The rear body 590 includes attachment structure for securing the sealing and cable attachment unit 570 to the rear end 541 of the connector body 530. For example, the rear body 590 includes snap-fit tabs 594 that fit within corresponding openings 595 defined by the connector body 530. In certain examples, environmental sealing is provided between the rear body 590 and the protective shell 528. For example, the rear body 590 can fit within the protective shell 528 and a seal can be provided therein between. In certain examples, the seal can include a radial seal that provides sealing between an exterior circumferential surface of the rear body 590 and an interior circumferential surface of the protective shell 528. In other examples, an axial seal may be used to provide sealing against an axial end of the protective shell 528. In the depicted example, the sealing and cable attachment unit 570 includes a radial seal 596 (e.g., an O-ring seal) that is radially compressed between an exterior surface of the rear body 590 and an interior surface of the protective shell 528. In the depicted example, the seal 596 mounts within a circumferential groove 598 defined about the periphery of the rear body 590. The sealing and cable attachment unit 570 further includes a rear pocket 599 for receiving the jacket 584 of the fiber optic cable 580. The rear pocket 599 is defined by a rear extension 600 of the rear body 590. In certain examples, a heat shrink sleeve can be applied over the rear extension and over the jacket so as to provide sealing between the rear body 590 and the exterior of the cable jacket 584.

In certain examples, the connector arrangement 520 can include a fastener 602 that connects the shroud 528 to the sealing and cable attachment unit 570. In the depicted example, the fastener 602 in the form of an internally threaded sleeve 602 having internal threads that mate with corresponding external threads provided at the rear end 547 of the protective shell 528. In certain examples, the fastener 602 is structured for enhancing sealing of the sealing and cable attachment unit 570 within the protective shell 528. For example, the fastener 602 can act as a radial compression element. When mounted at the rear end 547 of the protective shell 528, the fastener 602 can radially compress the protective shell 528. By radially compressing the rear end 547 of the protective shell 528, the seal 596 is radially compressed and friction between the protective shell 528 and the sealing and cable attachment unit 570 is enhanced so as to resist the sealing and cable attachment unit 570 from being withdrawn rearwardly from the protective shell 528. In certain examples, the fastener 602 and the protective shell 528 can have mating tapers that generate or enhance radial compression of the protective shell 528 as the fastener is threaded on the rear end of the protective shell 528.

The connector arrangement 520 further includes a strain relief boot 604 that mounts to the rear end 547 of the protective shell 528 and that coincides with a portion of the fiber optic cable 580. The strain relief boot 604 can have a flexible configuration and can be configured to provide strain relief and bend radius protection to the fiber optic cable 580 at the interface between the fiber optic cable and the connector arrangement 520.

In certain examples, one or more seals for sealing the port 524 can be provided between the fastening element and the closure 526.

In certain examples, the connector arrangement 520 can also include a dust cap 606 that mounts over the front end 539 of the fiber optic connector 522 and over the front end 545 of the protective shell 528 when the connector arrangement 520 is not in use. The dust cap 606 can include internal threads 608 that mate with the threads of the fastening element. When it is desired to use the connector arrangement 520, the dust cap is removed thereby allowing the connector arrangement 520 to be inserted into the port 524. When the connector arrangement 520 is inserted into the port 524, the front end 539 of the fiber optic connector 522 is received within the fiber optic adapter 542 and the ferrule 533 is received within the alignment sleeve 543 of the fiber optic adapter 542. Also, the front end 545 of the protective sleeve 528 fits within the port 524 and can be rotationally aligned by intermating keying structures such as projections, tabs, paddles, etc. With the protective shell 528 inserted within the port 524, the seal 549 forms a seal between the exterior of the protective shell 528 and the portion of the closure 526 defining the port 524. With the fiber optic connector 522 and the protective sleeve 528 inserted within the port 524, the fastening nut 553 can be slid forwardly along the protective shell 528 until the external threads 555 engage the internal threads 557 of the port 524. The fastening nut 553 is then threaded into the port 524. Engagement between the engagement portions 559, 561 retains the connector arrangement 520 within the port 524.

Figure 21:
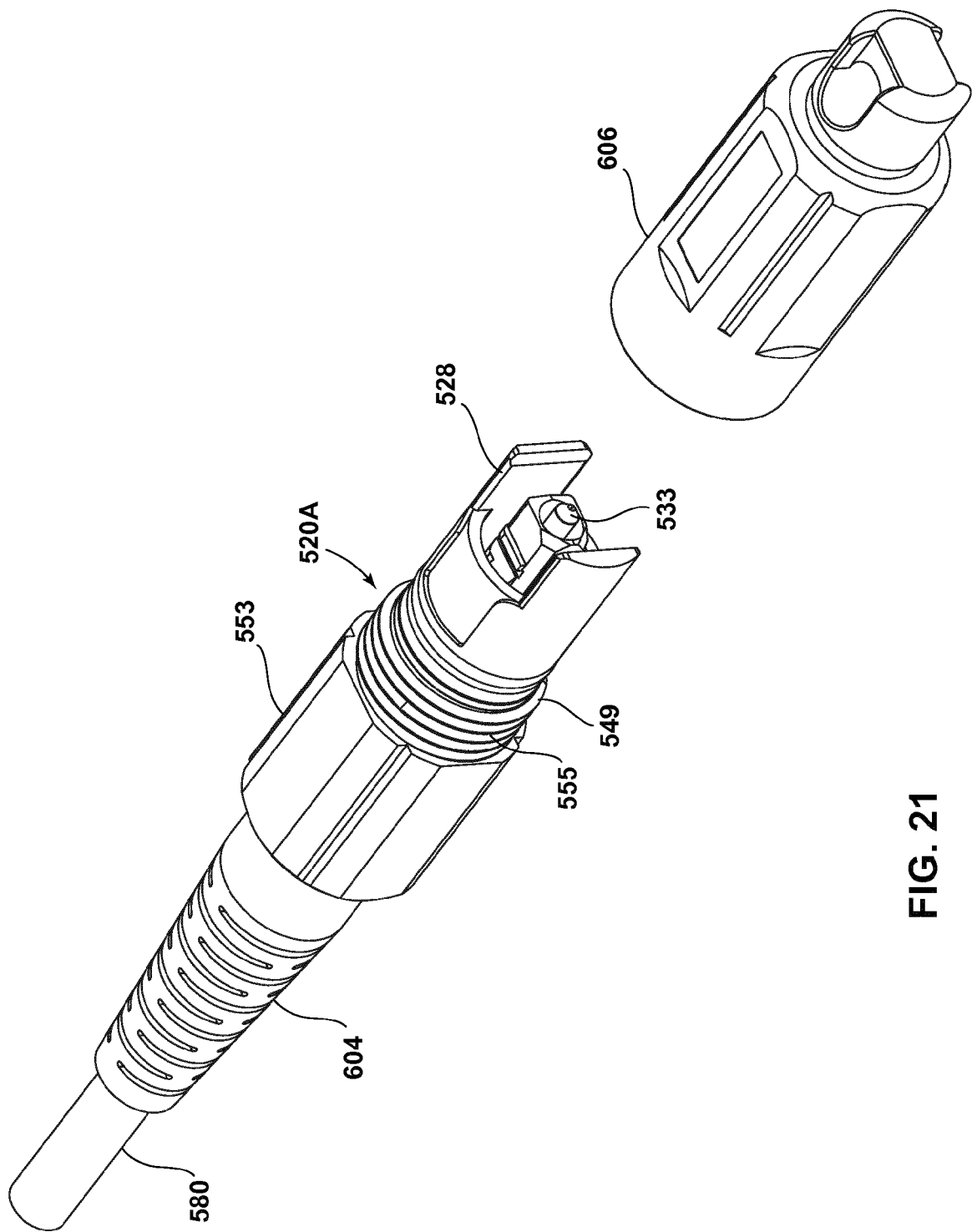
FIGS. 21-23 illustrate another connector arrangement 720 in accordance with the principles of the present disclosure.
Figure 22:
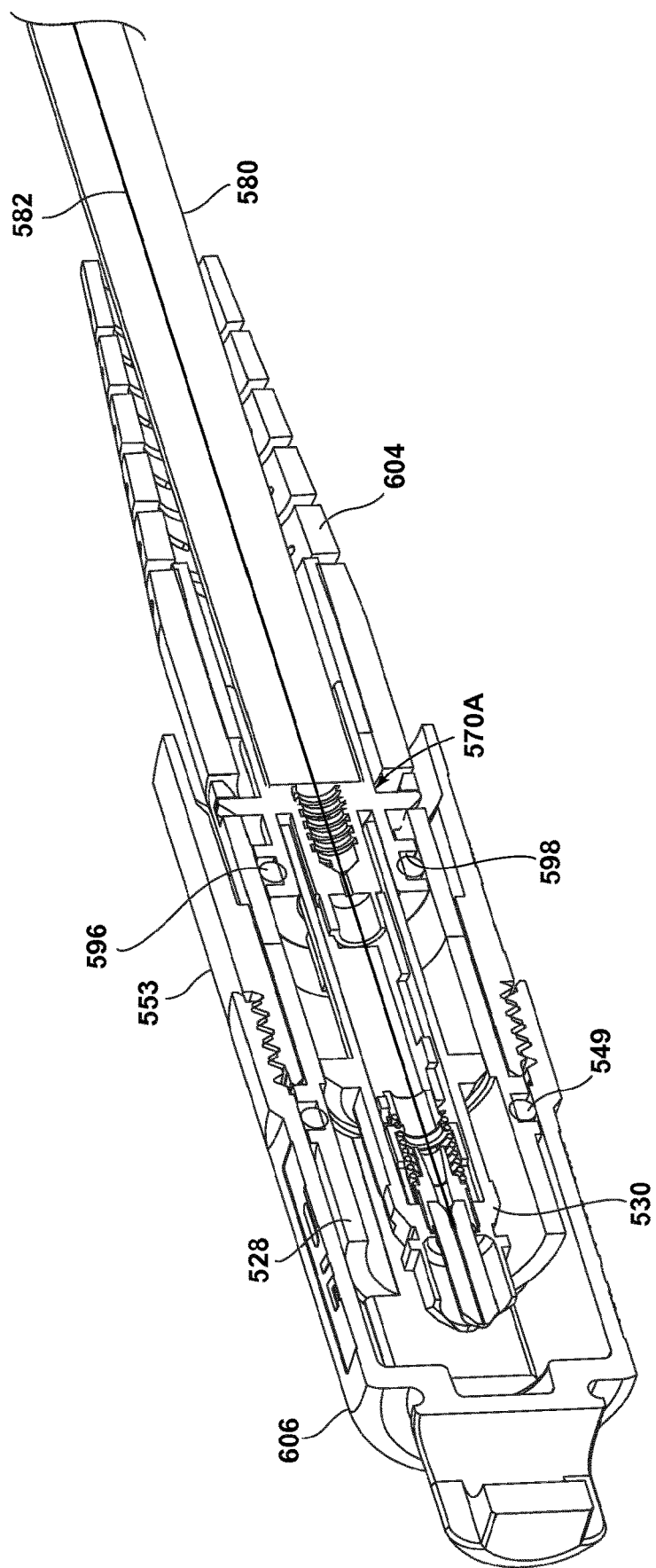
Figure 23:
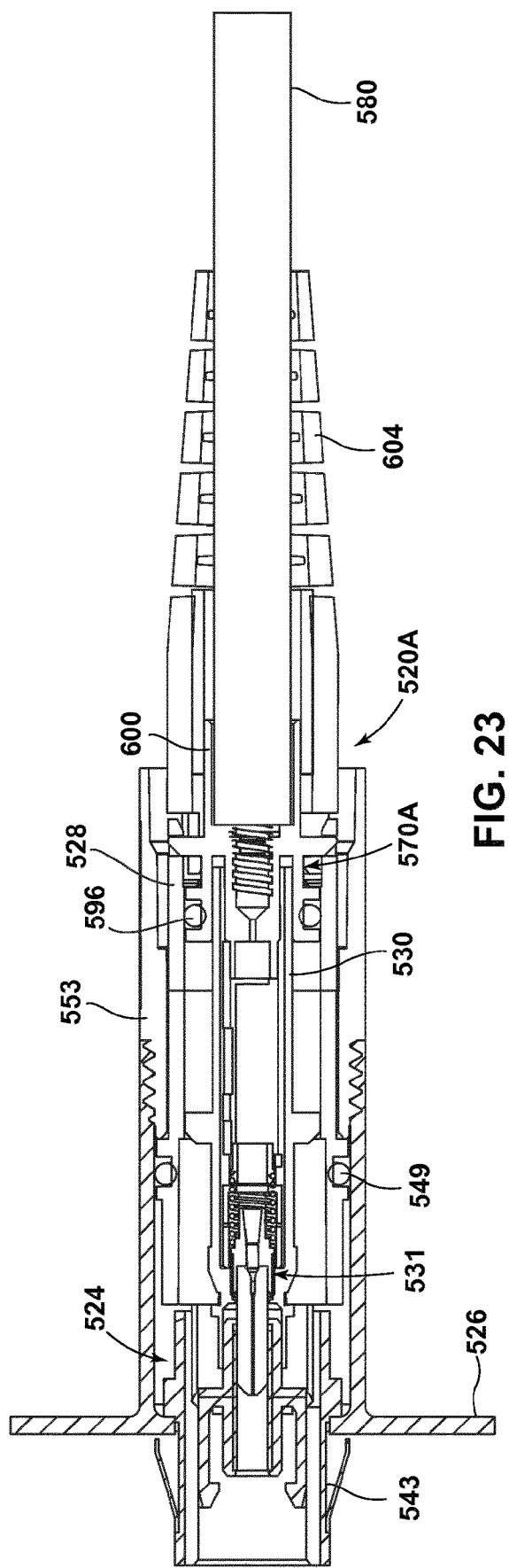

FIGS. 21-23 illustrate another connector arrangement 520A in accordance with the principles of the present disclosure. The connector arrangement 520A has the same basic arrangement as the connector arrangement 520 of FIGS. 18-20, except a modified sealing and cable attachment unit 570A is provided. The sealing and cable attachment unit 570A has the same basic construction as the sealing and cable attachment unit 570, except the sealing and cable attachment unit 570A is configured to interconnect with the rear end of the protective shell 528 by a snap-fit connection. For example, snap-fit tabs are snapped within corresponding openings defined by the protective shell 528 such that the sealing and cable attachment unit 570A is effectively attached to the protective shell 528. In one example, a front portion of the sealing and cable attachment unit 570A is inserted through the rear end 547 of the shell 528 and an intermediate portion of the sealing and cable attachment unit 570A attaches to the rear end 547 of the shell 528.

Figure 24:
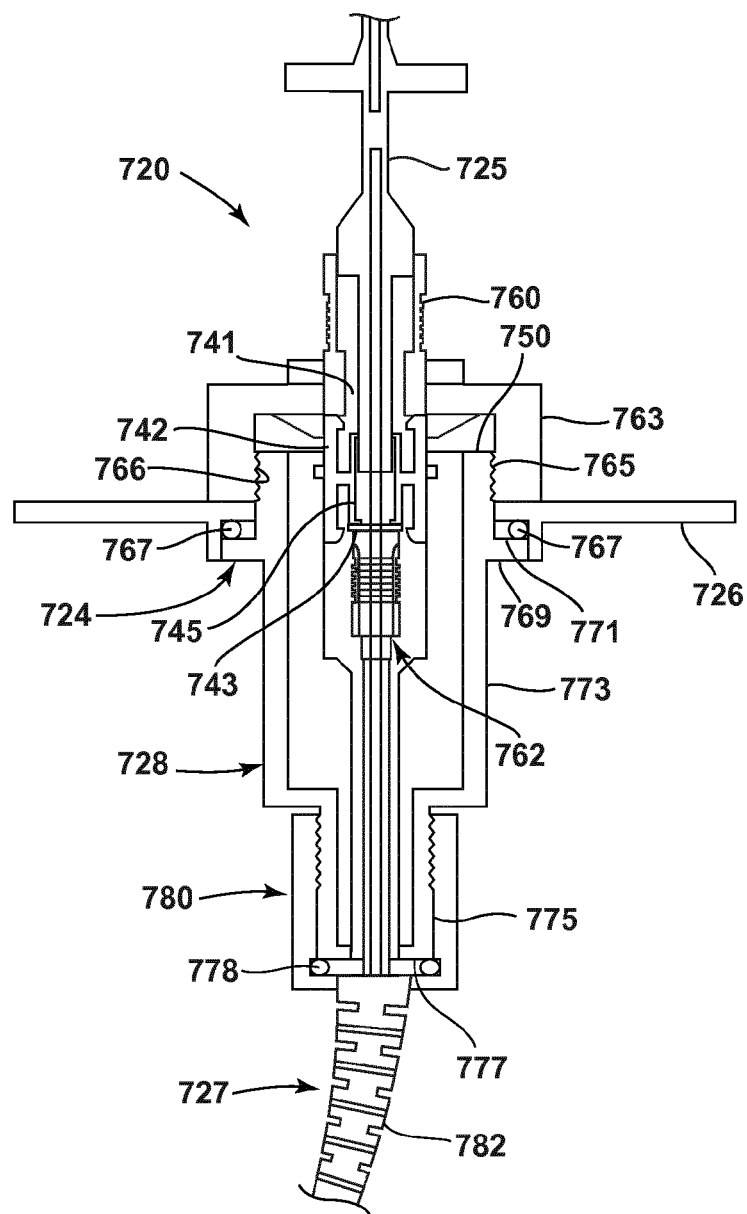
FIG. 24 illustrates another fiber optic connection system 720 in accordance with the principles of the present disclosure.

FIG. 24 illustrates another fiber optic connection system 720 in accordance with the principles of the present disclosure. The fiber optic connection system 720 includes a closure 726 (e.g., a housing, enclosure, box, etc.) defining a port 724. The fiber optic connection system 720 also includes a first fiber optic cable 725 positioned inside the closure 726 and a second fiber optic cable 727 positioned outside the closure 726. In certain examples, first fiber optic cable 725 is less robust than the second fiber optic cable 727. The first and second fiber optic cables 725, 727 have connectorized ends that are optically connected at the port 724.

Referring still to FIG. 24, a receptacle 750 forming an adapter mount is connected (integrally or mechanically connected) to an inner surface of the closure 726 in general alignment with the port 724. A fiber optic adapter 742 is mounted within the receptacle 750. While a variety of different styles of fiber optic adapters can be used, one example, the fiber optic adapter 742 is an SC-type fiber optic adapter adapted for receiving an SC-type fiber optic connector.

The fiber optic adapter 742 includes first and second opposite receptacles 741, 743. The fiber optic adapter 742 also includes an alignment sleeve 745. The first fiber optic cable 725 is terminated by a fiber optic connector 760 that is received in the first receptacle 741 and the second fiber optic cable 727 is terminated by a fiber optic connector 762 that is received within the receptacle 743. When received within their respective receptacles 741, 743, ferrules of the fiber optic connectors 760, 762 are coaxially aligned such that an optical connection is made between the optical fibers of the first and second optical cables 725, 727. In the depicted example, fiber optic connectors 760, 762 are SC-type connectors configured to latch within the first and second receptacles 741, 743. The fiber optic connectors 760, 762 include release sleeves that can be retracted to unlatch the fiber optic connectors 760, 762 from their respective receptacles 741, 743.

The fiber optic connection system 720 further includes a protective shell 728 that is secured to the closure 726 at the port 724 and that protects the fiber optic connector 762. In certain examples, protective shell 728 can have a fastening element for fastening the protective shell 728 to the closure 726 at the port 724. Sample fastening structures can include mating threads provided at the port 724 and the protective shell 728, mating bayonet connection elements provided between the protective shell 728 and the closure 726, snap-fit connections between the protective shell 728 and the closure 726, or other structures. As depicted, the protective shell includes a front end 763 having external threads 765 that mate with corresponding internal threads 767 defined within the port 724 (e.g., within the receptacle 750). In certain examples, environmental sealing is also provided between the closure 726 and the protective shell 728 at the port 724. As depicted, a seal 767 (e.g., an O-ring seal) is positioned around the protective shell 728 adjacent the front end 763. As depicted, the seal 767 is a face seal that is axially compressed between a flange 769 of the protective shell 728 and a sealing surface 771 of the closure 726 when the protective shell 728 is secured at the port 724.

Referring still to FIG. 24, the protective shell 728 further includes a main body 773 and a rear extension 775. The rear extension 775 has a smaller diameter than the main body 773 and projects rearwardly from the main body 773. The rear extension 775 defines a rear end 777 of the protective shell 728. The second fiber optic cable 727 extends through the rear end 777 of the protective shell 728 and extends through the main body 773 to the fiber optic connector 762 received within the fiber optic adapter 742. A seal 778 is used to provide a circumferential seal about the jacket of the fiber optic cable 727 and to provide sealing at the rear end 777 of the protective shell 728. In one example, the seal 778 can include an O-ring seal that extends around the outer diameter of the fiber optic cable 727. The fiber optic connection system 720 further includes a seal pressurization/deformation member 780. In one example, seal pressurization/deformation member 780 that is connected to the rear extension 775 and used to axially compress the seal 778 such that the seal radially deforms about the fiber optic cable 727 and effectively seals the opening defined through the rear extension 775. In one example, the seal pressurization member 780 is threaded on the rear extension 775.

The fiber optic connection system 720 further includes a boot 782 carried with the seal pressurization member 780 for providing strain relief and bend radius protection to the fiber optic cable 727 adjacent the rear end of the fiber optic connection system 720.

Figure 25:
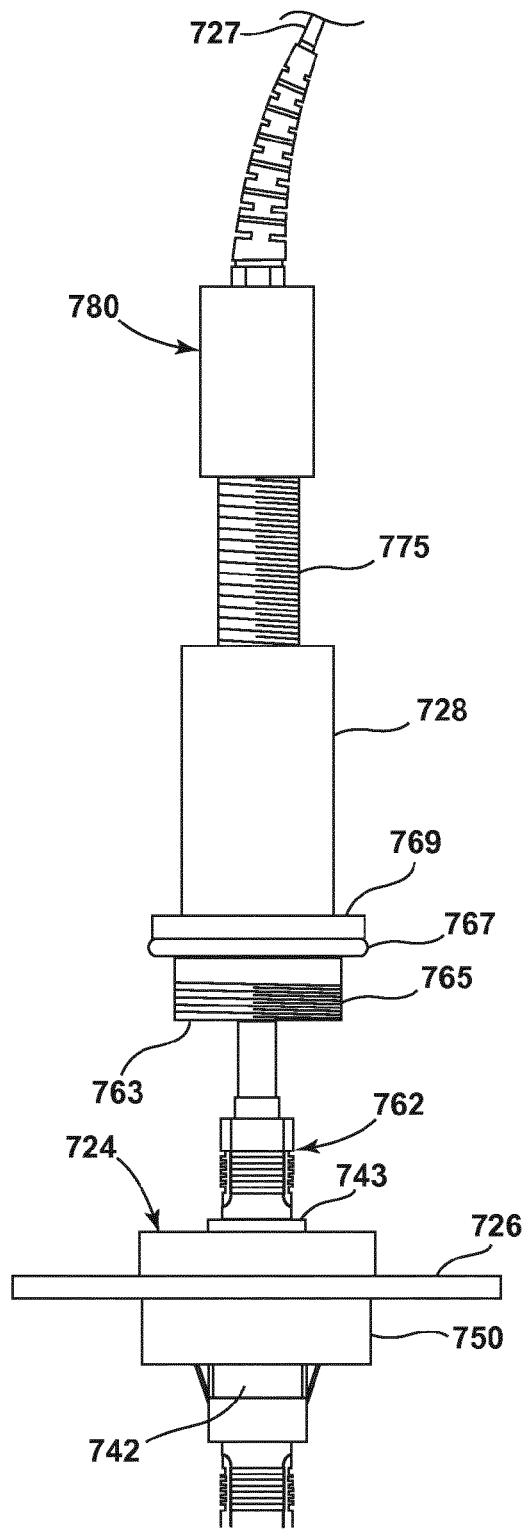
FIGS. 25-27 illustrate how an example protective shell can be movable along the fiber optic cable to provide access to the fiber optic connector.

Referring to FIG. 25, the protective shell 728 is movable along the fiber optic cable 727 to provide access to the fiber optic connector 762. For example, to access the fiber optic connector 762 when the fiber optic connector 762 is coupled to the port 724, the seal pressurization member 780 is initially loosened to decompress the seal 778. Next, the protective shell 728 is decoupled (e.g., unthreaded) from the port 724 and retracted rearwardly from the port 724 by sliding the protective shell 728 along the fiber optic cable 727 (see FIG. 25). Once the protective shell 728 has been retracted as shown at FIG. 25, the release sleeve of the fiber optic connector 762 can be manually grasped and retracted so as to disengage the fiber optic connector 762 from its corresponding receptacle 743 in the fiber optic adapter 742.

Figure 26:
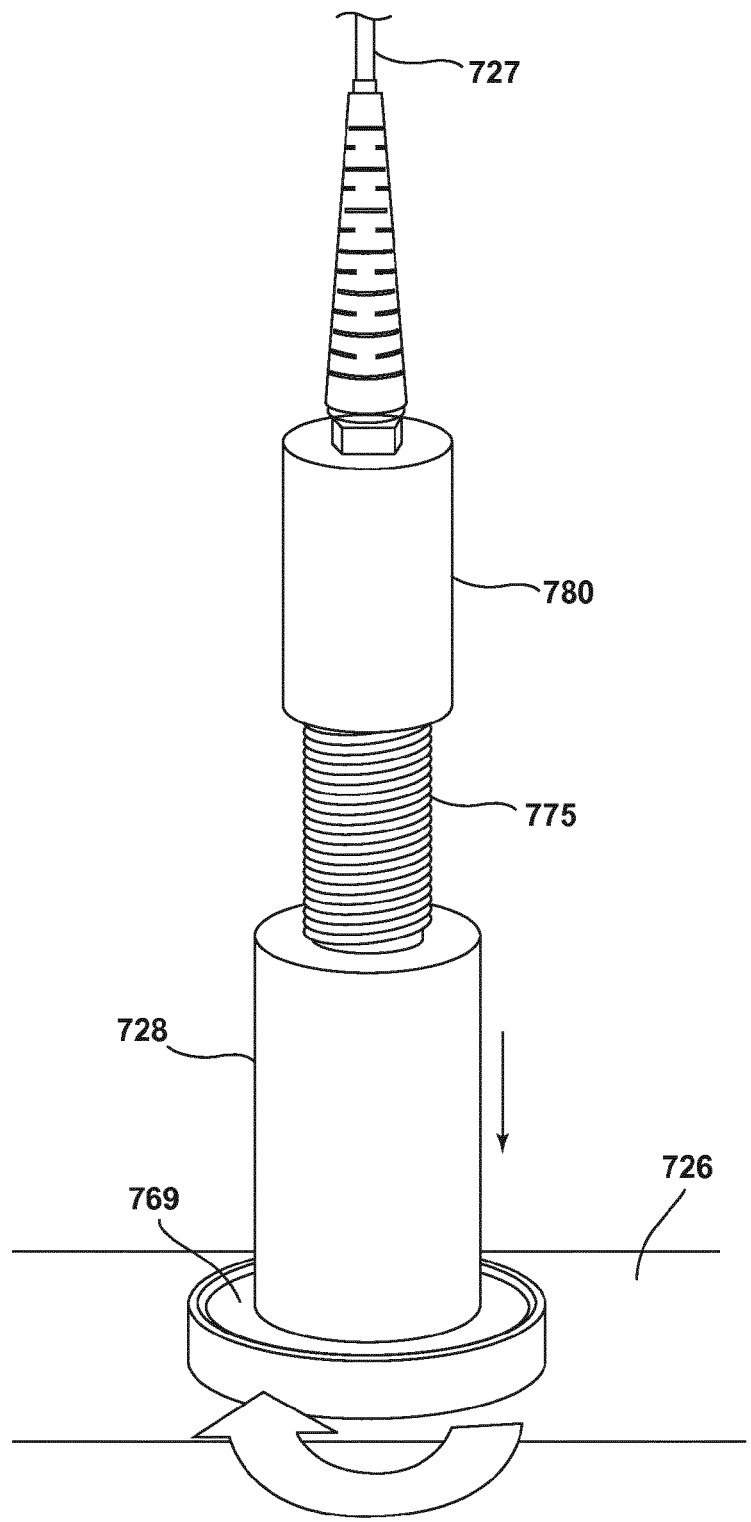
Figure 27:
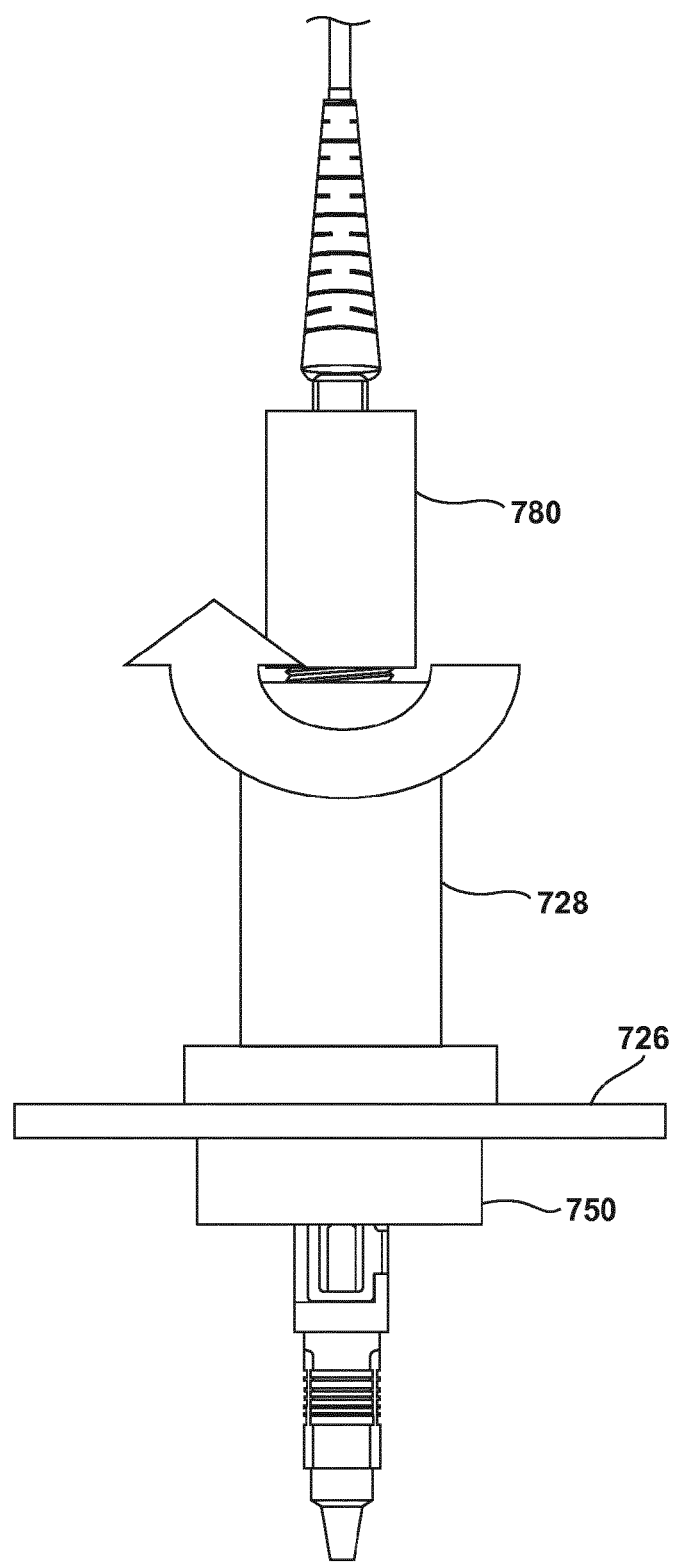

To secure and seal the fiber optic connector 762 at the port 724, the fiber optic connector 762 is initially inserted within the receptacle 743 of the fiber optic adapter 742. Next, the protective shell 728 is slid over the fiber optic connector 762 and threaded into the port 720 as shown at FIG. 26. With the protective shell 728 threaded within the port 724, the seal 767 is compressed to provide effective sealing around the port 724 and the front end 763 of the protective shell 728. Once the protective shell 728 has been secured within the port 724, the seal pressurization member 780 is threaded onto the rear extension 775 of the protective shell 728 thereby causing the seal 778 to be deformed to a sealing state in which the rear end 777 of the protective shell 728 is sealed so as to prevent moisture from intruding through the rear extension 775. FIG. 27 shows the seal pressurization member 780 in a sealing position.

FIGS. 28-31 show another fiber optic connection system 820 in accordance with the principles of the present disclosure. The fiber optic connection system 820 includes a closure 822 defining a port 824. The fiber optic connection system 820 further includes a first fiber optic cable 825 terminated by a first fiber optic connector 826 and a second fiber optic cable 827 terminated by a second fiber optic connector 828. The fiber optic connection system 820 further includes a fiber optic adapter 842 for optically coupling the first and second fiber optic connectors 826, 827 together such that an optical transmission path is defined between the first and second fiber optic cables 825, 827. In certain examples, the fiber optic connectors 826, 828 can have a form factor consistent with an SC-connector. However, as shown at FIG. 31, the fiber optic connectors 826, 828 can have modified shoulders that are angled or tapered so as to be removable from the fiber optic adapter 842 without the use of a release sleeve. Thus, depicted example, the fiber optic connector 828 does not have a release sleeve.

The fiber optic connection system 820 includes a receptacle 850 through which the fiber optic cable 825 extends. A spring 851 or other biasing structure is provided within the receptacle 850. When the fiber optic connection system 820 is assembled and connected together, the spring 851 engages the fiber optic connector 826 to provide resilience support that allows the fiber optic connector to float within the receptacle 850.

In other examples, the outer port of the fiber optic adapter 842 may be configured to not include any latches thereby eliminating the need for a release sleeve on the second fiber optic connector 828.

The fiber optic connection system 820 further includes a protective outer shell or shroud 860 having a front end 862 and an opposite rear end 864. The shroud 860 extends over the connector body 830. A sealing element 866 is positioned about the protective shell 860 adjacent the front end 862. In certain examples, the sealing element 866 can butt against a radial shoulder 868 that projects outwardly from a main body of the protective outer shell 860. When the protective outer shell 860 is secured within the port 824, the sealing element 866 is axially compressed to provide an effective seal between the protective outer shell 860 and the closure 822.

Figure 28:
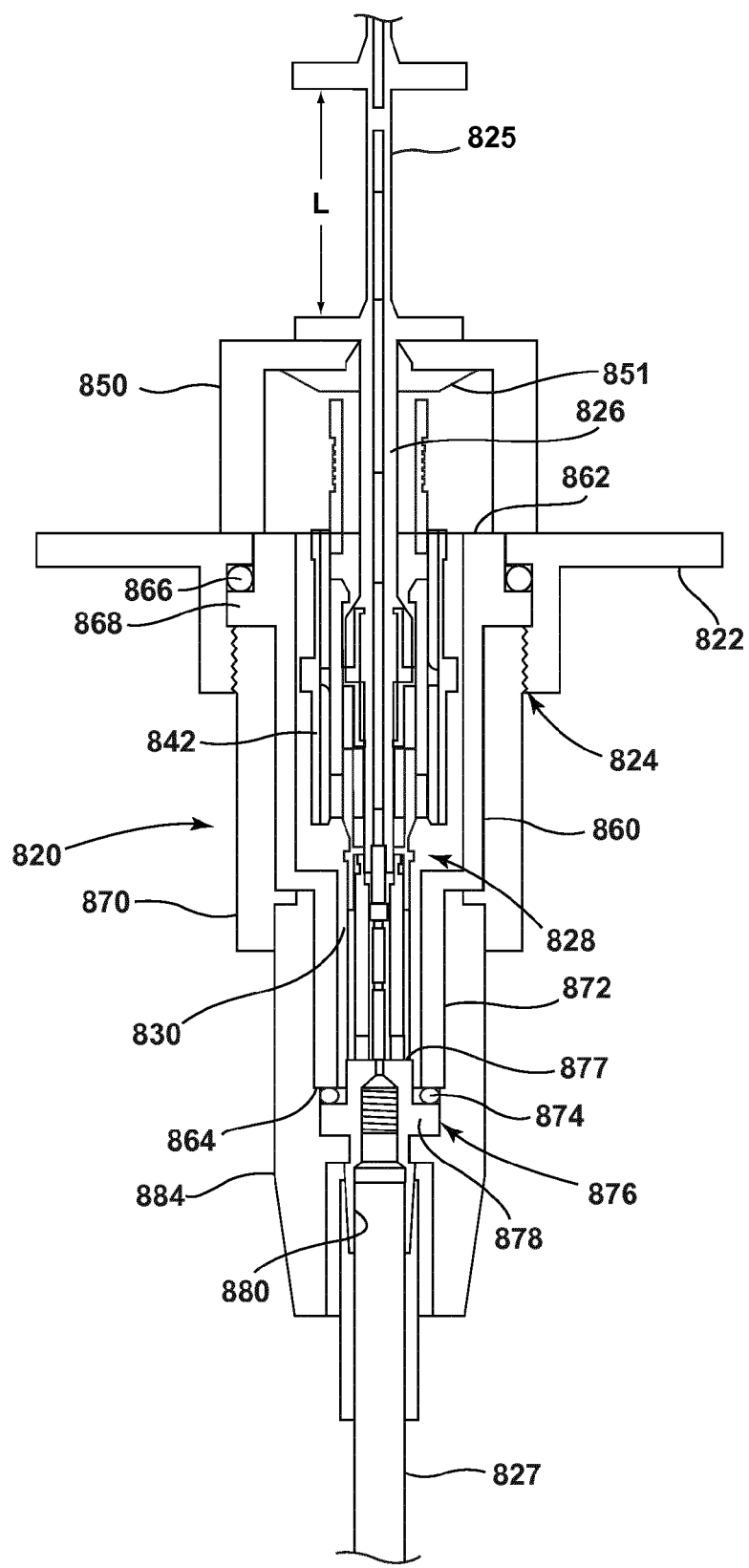

The fiber optic connection system 820 further includes a port fastener 870 for securing the protective outer shell 860 within the port 824. In one example, the port fastener 870 is a retention nut having external threads that mate with corresponding internal threads defined within the port 824. As shown at FIG. 28, the port fastener 870 can abut against the radial shoulder 868 to effectively retain the protective outer shell 860 within the port 824. In alternative embodiments, the port fastener 870 can include other types of retention structures such as snap-fit structures, ratchet structures, bayonet-type fittings or other types of structures for effectively securing the port fastener 870 to the closure 822. It will be appreciated that the port fastener 870 can be rotated relative to the protective outer shell 860 so as to allow the port fastener 870 to be threaded into the port 824 without rotating the protective outer shell 860.

The protective outer shell 860 includes a main body and a rear extension 872. A sealing element 874 is provided adjacent the rear extension for sealing the rear end 864 of the protective outer shell 860. The sealing element 874 is mounted about sealing and cable attachment unit 876 having a forward end 877 that fits within the rear extension 872 of the shroud 860. The sealing element 874 is captured between the rear end 864 of the protective outer shroud 860 and a radial flange 878 of the sealing and cable attachment unit 876. The sealing and cable attachment unit 876 also includes a rear pocket 880 in which a jacket of the second fiber optic cable 827 can be secured. In certain examples, a cable seal, such as a shape-memory (e.g., heat shrink) sealing sleeve, can be secured over the jacket and over the rear of the rear insert so as to effectively seal the fiber optic cable 827 relative to the sealing and cable attachment unit 876.

Figure 29:
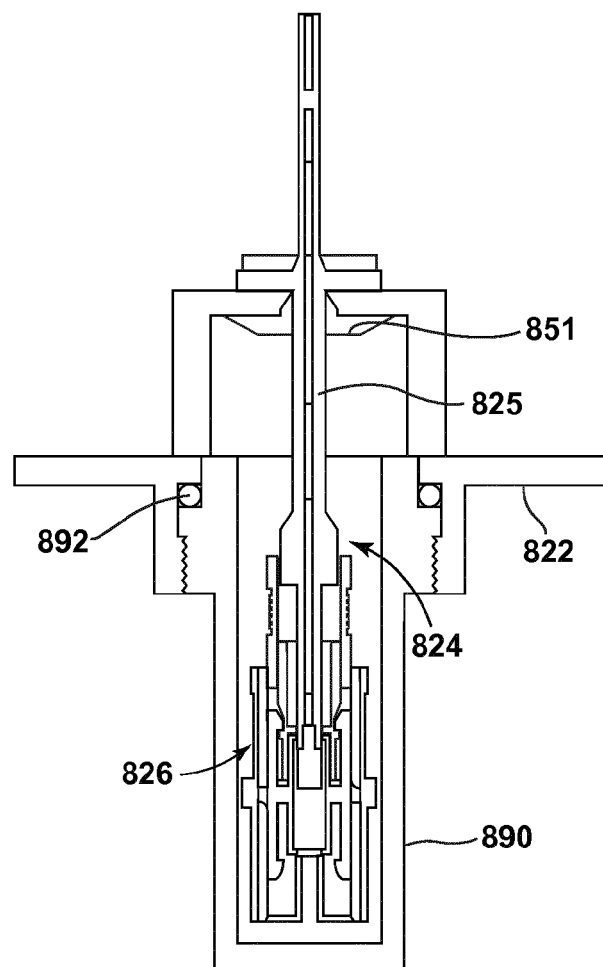
Figure 30:
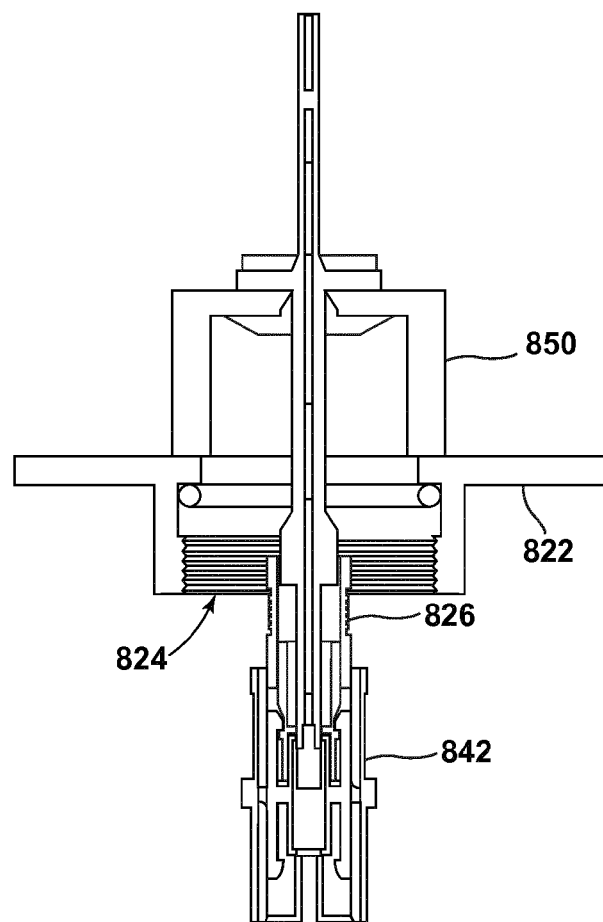

The fiber optic connection system 820 further includes a seal compression element 884 that attaches to the rear extension 872 of the protective outer shroud 860 and that functions to axially compress the sealing element 874. In one example, fastening elements such as threads can be provided between the seal compression element 884 and the rear extension 872. By threading the seal compression element 884 on the rear extension 872, the sealing and cable attachment unit 876 is forced axially toward the rear end 864 of the rear extension 872, thereby causing the sealing element 874 to be compressed between the rear end 864 and the radial flange 878. When compressed, the sealing element 874 effectively seals the rear end of the protective outer shell 860. In certain examples, the first fiber optic connector 826 can be extended and retracted relative to the port 824. For example, the first fiber optic cable 825 can include a stop positioned a length L from the fiber optic connector 826. This allows the connector to be pulled the predetermined length L from the port 824 to provide access for cleaning or making connections. FIG. 29 shows the fiber optic connector 826 in the extended position, while FIG. 28 shows the fiber optic connector in the retracted position. In the retracted position of FIG. 28, the fiber optic connector 826 seats against the spring 851.

FIG. 29 shows the port 824 prior to making a connection between the first and second fiber optic cables 825, 827. As shown at FIG. 29, the port 824 is closed and sealed by a dust cap 890 that is threaded into the port 824 and that includes a port seal 892. As shown at FIG. 29, the fiber optic adapter 842 is absent from the port 824.

To make an optical connection between the first and second fiber optic cables 825, 827, the dust cap 890 is removed and the fiber optic adapter 842 is installed on the first fiber optic connector 826. Next, the second fiber optic connector 828 is inserted into the fiber optic adapter 842 such that an optical connection is made between the first and second fiber optic cables 825, 827. Next, the connector assembly is retracted back into the port 824 until the first fiber optic connector 826 abuts against the spring 851. Subsequently, the protective outer shell 860 is inserted over the connector assembly and inserted into the port 824 until the sealing element 866 is compressed between the radial shoulder 868 and a corresponding sealing surface of the port 824. The attachment element 870 is then threaded into the port 824, thereby locking the protective outer shell 860 within the port 824 and compressing the sealing element 866. Finally, the seal compression element 884 is threaded onto the rear extension 872 over the protective outer shell 860 to effectively compress the sealing element 874. Unlike the previous example system, it is not necessary to decompress the sealing element 874 to remove the second fiber optic connector 828 from the fiber optic adapter 842. Instead, to disconnect the second fiber optic connector 828 from the fiber optic adapter 842, the attachment element 870 is disconnected from the port 870 and the protective outer shell 860 is withdrawn from the port 824. As the protective outer shell 860 is withdrawn from the port 824, the second fiber optic connector 828 moves with the protective outer shell 860 and disengages from the fiber optic adapter 842. Unlike the previous example, the second fiber optic connector 828 does not include a release sleeve that is required to be accessed to disengage the fiber optic connector 828 from the fiber optic adapter 842.

As shown at FIG. 29, prior to use of the port 824, the fiber optic adapter 842 is not installed on the fiber optic connector 825. In certain examples, this can assist in differing costs. However, in other examples, the fiber optic adapter 842 can be installed on the first fiber optic connector 825 and stored within the dust cap prior to connection with the second fiber optic cable 827. In still further examples, the fiber optic adapter 842 can be integrated with the second fiber optic connector 828 (e.g., be installed on the second fiber optic connector 828 within the protective outer shell 860). In this example, the fiber optic adapter 842 and the second fiber optic connector 828 are inserted together into the port 824 along with the protective outer shell 860 during the connection process. Insertion continues until the first fiber optic connector 825 snaps into the fiber optic adapter 842 and subsequently abuts against the spring 851.

As described above, in the fiber optic connection system 820, the first fiber optic connector 826 can be extended and retracted relative to the port 824 by pulling the first fiber optic cable 825 outwardly from the closure 822 through the port 824, and by pushing the fiber optic cable 825 back into the closure 822 through the port 824. As indicated above, a stop can be provided on the first fiber optic cable 825 for limiting the length of the first fiber optic cable 825 that can be extended from the port 824. FIG. 32 shows an alternative embodiment where a stop is provided that prevents the first fiber optic connector 826 from being extended from the port 824 and ensures that the first fiber optic connector 826 remains seated against the spring 851.

FIGS. 33-37 illustrate a ruggedized, customizable fiber optic connector system 900 in accordance with the principles of the present disclosure. The fiber optic connector system 900 includes an elongate connector core 902. The fiber optic connector system 900 also includes first and second ruggedized exterior assemblies 904, 906 that can be mounted over the elongate connector core 902 to customize the fiber optic connector system 900. For example, a user may choose whether to mount the first ruggedized exterior assembly 904 or the second ruggedized exterior assembly 906 over the elongate connector core 902.

The first and second ruggedized exterior assemblies 904, 906 have different configurations from one another. For example, the first ruggedized exterior assembly 904 has a configuration that is compatible with a first ruggedized fiber optic adapter 908 while the second ruggedized exterior assembly 906 has a configuration that is compatible with a second ruggedized fiber optic adapter 910. The first and second ruggedized fiber optic adapters 908, 910 have different fastening and keying configurations and, therefore, are typically compatible with different styles of fiber optic connectors.

By selecting either the first ruggedized exterior assembly 904 or the second ruggedized exterior assembly 906 and mounting the selected ruggedized exterior assembly on the elongate connector core 902, the fiber optic connector system 900 can be readily customized in the field so as to be compatible with the particular style of fiber optic adapter that may be encountered in the field. In this way, the elongate connector core 902 functions as a precursor structure that can readily be made compatible with different styles of ruggedized fiber optic adapters by selecting the appropriate ruggedized exterior assembly and mounting the selected ruggedized exterior assembly on the elongate connector core 902.

Figure 33:
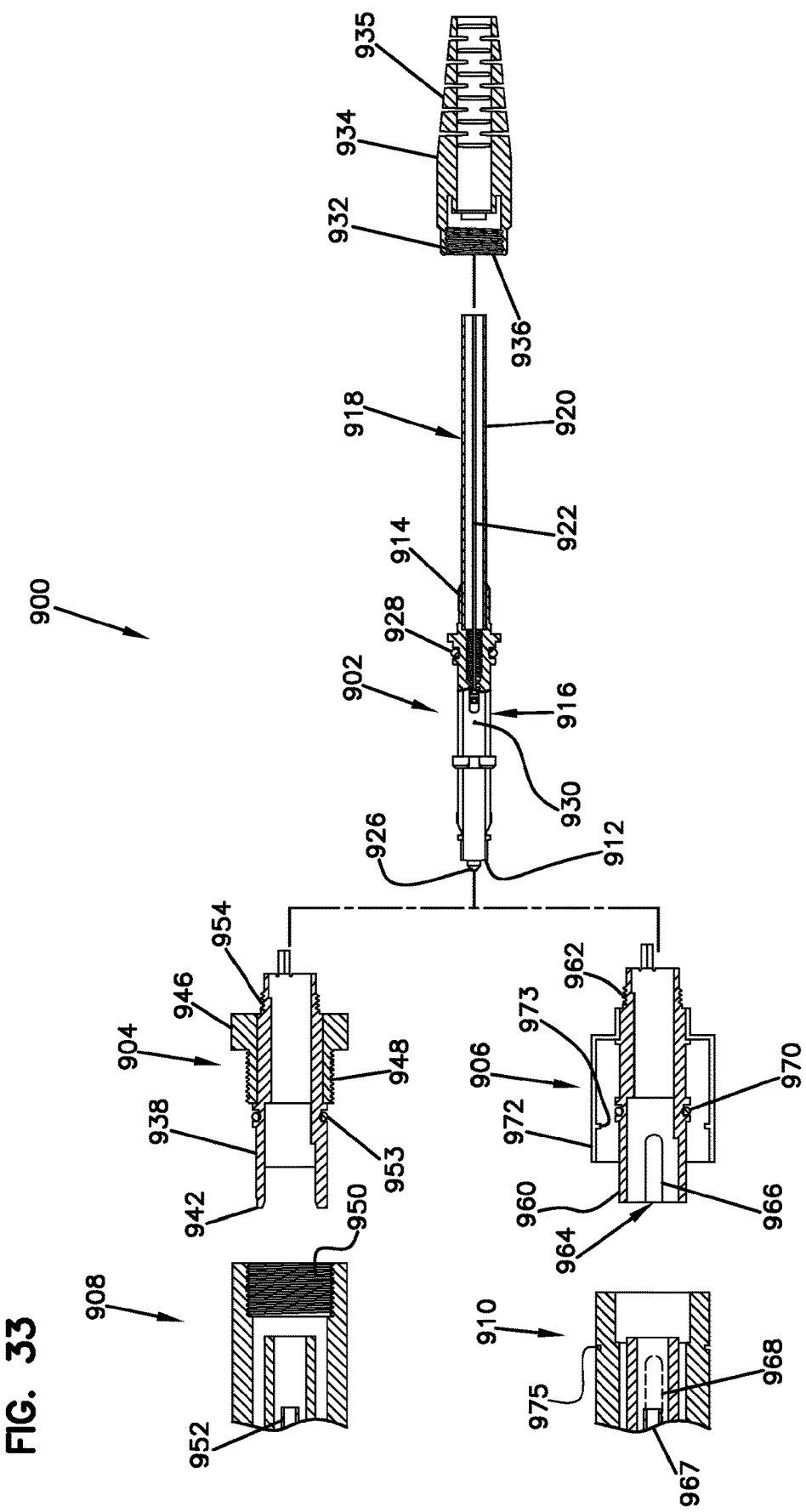
FIG. 33 illustrates a customizable fiber optic connector system including an elongate connector core in accordance with the principles of the present disclosure.

Referring to FIG. 33, the elongate connector core 902 includes a front end 912 and an opposite rear end 914. In certain examples, the elongate connector core 902 can include a core housing 916 that extends from the front end 912 to the rear end 914. It will be appreciated that the core housing 916 can include one or more pieces.

The front end 912 of the elongate connector core 902 defines a plug portion configured to be received within a fiber optic adapter. In certain examples, the plug portion can have a form factor that matches an existing conventional connector style such as a form factor corresponding to an SC connector, an LC connector, or other type of fiber optic connector. In one example, the plug portion can have a form factor consistent with a DLX connector of the type disclosed in U.S. Pat. No. 7,467,896, the disclosure of which is hereby incorporated herein by reference in its entirety.

Still referring to FIG. 33, the rear end 914 of the elongate connector core 902 defines a cable anchoring location for securing a fiber optic cable 918 to the elongate connector core 902. It will be appreciated that the fiber optic cable 918 can include an outer jacket 920 surrounding an optical fiber 922. The fiber optic cable 918 can also include strength members (e.g., tensile strength members such as Aramid yarns, fiber reinforced epoxy rods, etc.) that are secured to the cable anchoring location of the elongate connector core 902. In certain examples, the strength members can be secured using conventional techniques such as crimping or adhesive.

Figure 34:
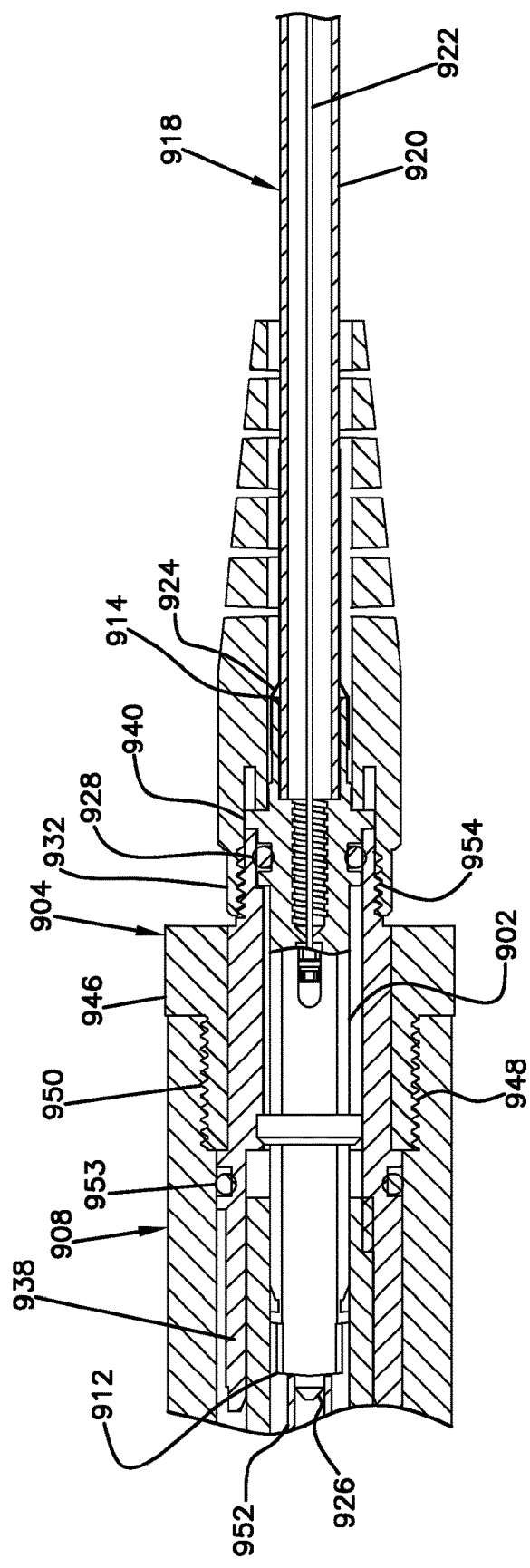
FIG. 34 illustrates the customizable fiber optic connector system of FIG. 33 with a first ruggedized exterior assembly secured on the elongate connector core.
Figure 35:
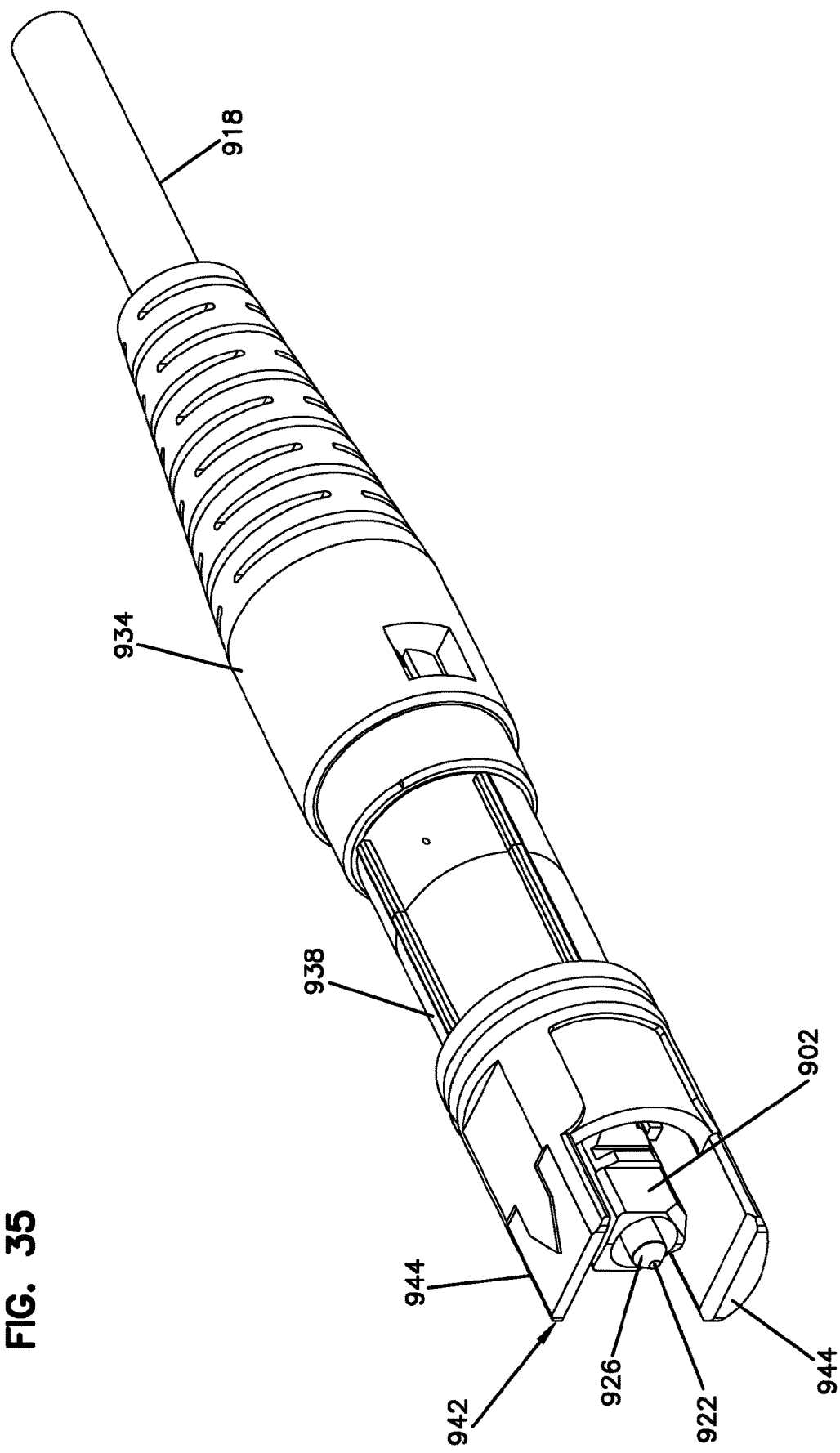
FIG. 35 shows the connector arrangement of FIG. 34 in perspective view with an outer fastening element removed for clarity.

It will be appreciated that the fiber optic cable 918 can also be sealed relative to the elongate connector core 902. For example, as shown at FIG. 34, a shape-memory sleeve 924 (e.g., a heat shrink sleeve) is shown covering the interface between the rear end 914 of the elongate connector core 902 and the fiber optic cable 918. In certain examples, the shape-memory sleeve 924 can be adhesively bonded to the elongate connector core 902 and the outer surface of the outer jacket 920. Thus, the shape-memory sleeve 924 can function to mechanically anchor the fiber optic cable 918 to the elongate connector core 902 while also providing a seal between the elongate connector core 902 and the fiber optic cable 918.

In certain examples, optical access to the optical fiber 922 can be provided at the plug portion defined by the front end 912 of the elongate connector core 902. For example, a ferrule 926 can be provided at the front end 912 of the elongate connector core 902. The optical fiber 922 can be coupled to the ferrule 926. For example, the optical fiber 922 can be directly potted within a central bore of the ferrule 926. Alternatively, the optical fiber 922 can be spliced to a stub fiber potted within the bore of the ferrule 926. In either alternative, the optical fiber 922 is considered optically coupled to the ferrule 926. In certain examples, the ferrule 926 can be spring biased in a forward direction toward the front end 912 of the elongate connector core 902.

In certain examples, the elongate connector core 902 is tunable. By tunable, it is meant that the rotational orientation of the ferrule 926 about its central longitudinal axis can be adjusted relative to the core housing 916 to position a core offset (i.e., an eccentricity) of the optical fiber within the ferrule 926 at a desired rotational position. Examples of tuning are disclosed at U.S. Pat. No. 5,212,752 and PCT International Publication No. WO 02/052310, the disclosures of which are hereby incorporated herein by reference in their entirety. It will be appreciated that tuning of the elongate connector core 902 can take place during assembly of the elongate connector core 902. During the assembly process, the core offset of the optical fiber within the ferrule 926 can be rotated to a particular rotational orientation relative to a key structure corresponding to the core housing 916. Once tuned, the rotational position of the ferrule 926 can be retained relative to the core housing 916 by an interface between a ferrule hub of the ferrule 926 and the core housing 916 or by other types of retention arrangements provided within the core housing 916. In certain examples, keyed relationships also exist between the elongate connector core 902 and shrouds of the ruggedized exterior assemblies 904, 906 such that the shrouds can only be mounted to the core 902 in one predetermined rotational orientation.

As shown at FIG. 33, the elongate core 902 can include a seal 928 configured for providing an annular seal between the core housing 916 and the first ruggedized exterior assembly 904 or between the core housing 916 and the second ruggedized exterior assembly 906. In one example, the seal 928 is an O-ring mounted within an annular groove defined by the core housing 916. In certain examples, the seal 928 is not configured to engage with a corresponding ruggedized adapter. Thus, in certain examples, the sole function of the seal 928 is to provide sealing with a ruggedized exterior assembly used to customize the elongate connector core 902 to a particular adapter style. In the depicted example, the seal 928 is positioned rearward of a longitudinal midpoint 930 of the elongate connector core 902. Such a rearward positioning of the seal 928 prevents the seal 928 from being used to provide an annular seal within the port of a corresponding fiber optic adapter.

The fiber optic connector system 900 further includes a fastener that mounts on the elongate connector core 902 and that is suitable for attaching either the first ruggedized connector assembly 904 or the second ruggedized exterior assembly 906 to the elongate connector core 902. In certain examples, the fastener can be a threaded member such as a nut, a bayonet-type fitting, a snap-fit structure, or other structure. In the depicted embodiment, the fastener includes a fastening structure 932 incorporated into a strain-relief boot 934 that mounts at the rear end 914 of the elongate connector core 902. The strain-relief boot 934 is configured to provide strain relief to the fiber optic cable 918 at the interface between the rear end 914 of the elongate connector core 902 and the fiber optic cable 918. In certain examples, a strain-relief boot 934 can have a resilient, polymeric construction. In the depicted example, the rear strain-relief boot 934 includes a tapered rear end 935 having an exterior surface that tapers inwardly as the strain-relief boot 934 extends in a rearward direction. The tapered rear end 935 can include circumferential slits or slots that function to segment the tapered rear end 935 of the strain-relief boot 934 so as to enhance the flexibility. The fastening structure 932 is depicted as internal threads 936 provided within the strain-relief boot 934 adjacent a front end of the strain-relief boot 934. In certain examples, the front end of the strain-relief boot 934 can have a construction that is more rigid or more robust than the rear end of the strain-relief boot. In certain examples, the fastening structure 932 can be embedded or otherwise integrated into the strain-relief boot 934. In other examples, the fastening structure 932 can be a unitary feature molded or otherwise formed into the strain-relief boot 934.

Referring again to FIG. 33, the first ruggedized exterior assembly 904 is configured to be mounted over the elongate connector core 902 and includes a first shroud 938 configured to be mounted in sealed relation over the elongate connector core 902. For example, as shown at FIG. 34, when the first shroud 938 is installed over the elongate connector core 902, a rear end of the first shroud 938 abuts against an annular shoulder 940 of the elongate connector core 902 and the seal 928 provides an annular radial seal circumferentially between the exterior circumference of the elongate connector core 902 and the inner circumference of the first shroud 938. The first shroud 938 has a forward end that includes a first keying arrangement 942 for rotationally keying the first shroud 938 relative to the first ruggedized fiber optic adapter 908. As depicted, the first keying arrangement 942 includes a pair of paddles 944 (see FIG. 35) configured to be received within corresponding recesses (not shown) defined within the port of the first ruggedized fiber optic adapter 908. The first ruggedized exterior assembly 904 also includes a first ruggedized fastening element 946 (omitted from FIG. 35) for securing the first ruggedized exterior assembly 904 to the first ruggedized fiber optic adapter 908. In one example, the first ruggedized fastening element 946 includes a coupling nut having external threads 948 that mate with corresponding internal threads 950 of the first ruggedized fiber optic adapter 908 to secure the elongate connector core 902 and the first ruggedized exterior assembly 904 within the first ruggedized fiber optic adapter 908.

As shown at FIG. 34, the first fiber optic adapter 908 includes an alignment sleeve 952 that receives the ferrule 926. Additionally, the first ruggedized exterior assembly 904 includes an exterior seal 953 that provides a circumferential radial seal between the first shroud 938 and the inner surface of the first ruggedized fiber optic adapter 908. Referring to FIG. 34, the rear end of the first shroud 938 includes a fastening feature 954 (e.g., external threads) that couples with the fastening structure 932 to secure the first shroud 938 to the elongate connector core 902.

In other examples, the first ruggedized fastening element 946 can have alternative configurations. For example, in alternative configurations, the first ruggedized fastening element can include a sleeve having internal threads that mate with corresponding external threads of a corresponding fiber optic adapter. In certain examples, the first ruggedized fastening element 946 is a twist-to-lock fastening element. In other examples, snap-fit or other types of interlocking mechanisms also can be used. In certain examples, the fastening structure 932 can be referred to as a shroud retainer. In certain examples, the shroud retainer is not configured to engage with a corresponding ruggedized fiber optic adapter. In certain examples, the sole function of the shroud retainer is to retain a selected ruggedized exterior assembly to the elongate connector core 902.

Figure 36:
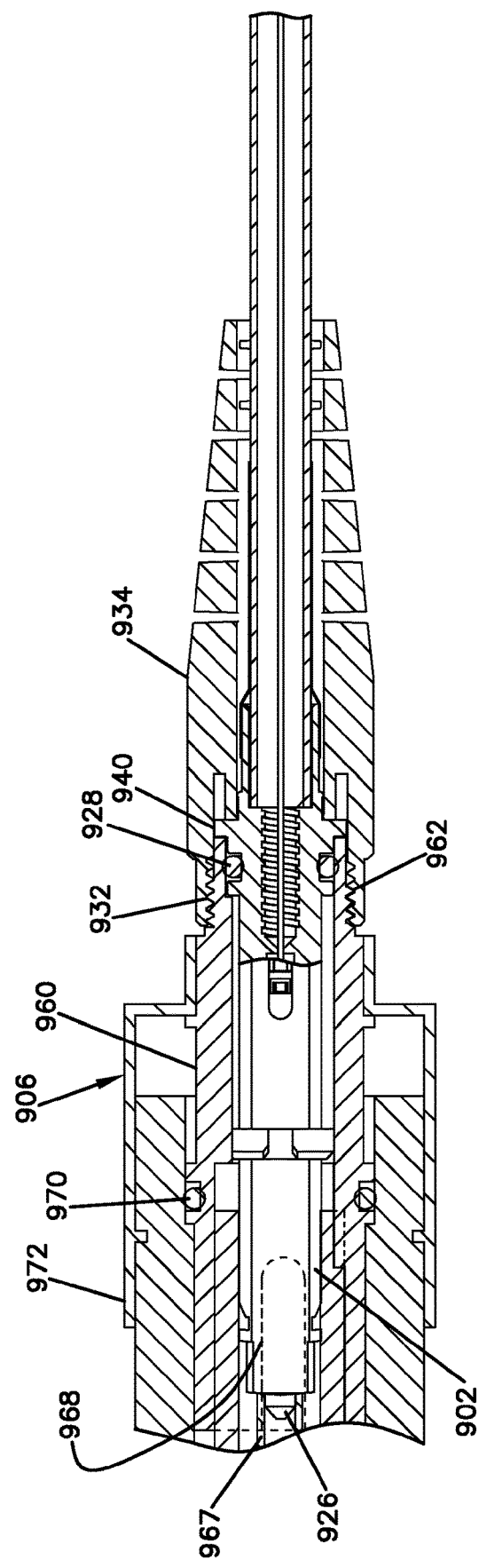
FIG. 36 shows the customizable fiber optic connector system of FIG. 33 with a second ruggedized exterior assembly secured on the elongate connector core.
Figure 37:
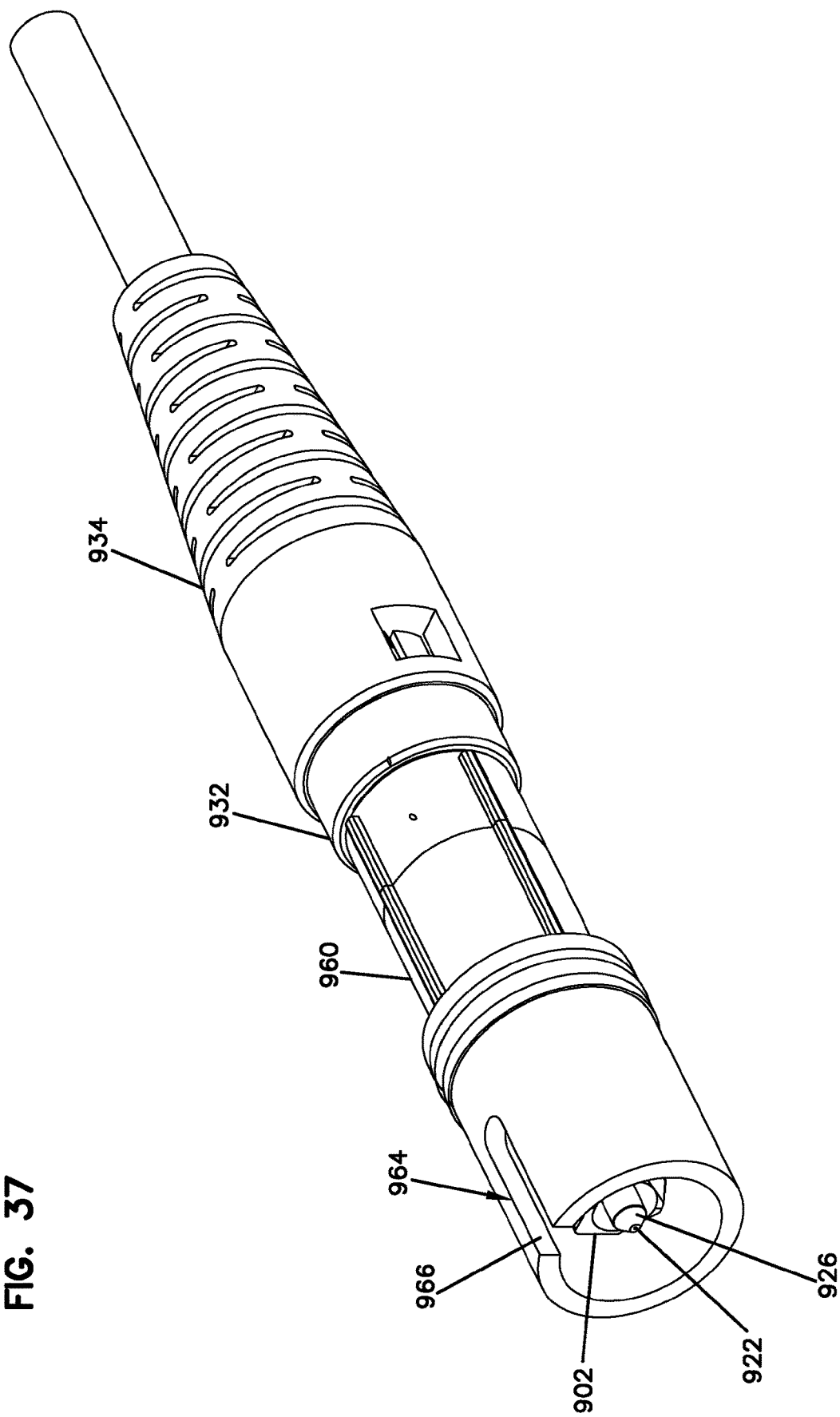
FIG. 37 is a perspective view of the connector arrangement of FIG. 36 with an outer fastening element removed for clarity.

Referring back to FIG. 33, the second ruggedized exterior assembly 906 is configured to be mounted over the elongate connector core 902 and includes a second shroud 960 configured to be mounted in sealed relation over the elongate connector core 902. When the second shroud 960 is mounted over the elongate connector core 902, a rear end of the second shroud 960 abuts against the annular shoulder 940 of the elongate connector core 902 and a fastening feature 962 (e.g., external threads) engage with the fastening structure 932 to axially retain the second shroud 960 on the elongate connector core 902. Additionally, as shown at FIG. 36, the seal 928 forms a radial, circumferential seal between the elongate connector core 902 and an internal surface of the second shroud 960.

The second shroud 960 has a forward end including a second keying arrangement 964 for rotationally keying the second shroud 960 relative to the second ruggedized fiber optic adapter 910. For example, the second keying arrangement 964 can include an open ended slot 966 defined at the forward end of the second shroud 960. When exterior assembly 906 is installed on the elongate connector core 902 and inserted into the port of the second ruggedized fiber optic adapter 910, the open ended slot 966 receives a corresponding projection 968 provided within the second ruggedized fiber optic adapter 910 so as to provide rotational keying of the second shroud 960 and the second ruggedized fiber optic adapter 910. As so inserted, the ferrule 926 of the elongate connector core 902 is received within an alignment sleeve 967 of the second ruggedized fiber optic adapter 910 and an exterior seal 970 provided around the second shroud 960 provides a radial, circumferential seal between an outer surface of the second shroud 960 and an inner surface of the second ruggedized fiber optic adapter 910.

The second ruggedized exterior assembly 906 also includes a second ruggedized fastening element 972 for securing the second ruggedized exterior assembly 906 with the elongate connector core 902 secured thereto to the second ruggedized adapter 910. In the depicted example, the second ruggedized fastening element 972 includes a sleeve having a bayonet-style connection configuration. For example, the sleeve can include internal bayonet pins 973 that fit within corresponding bayonet slots 975 defined in a collar of the second ruggedized fiber optic adapter 910. FIG. 36 shows the bayonet-style sleeve interlocked with the collar of the second ruggedized fiber optic adapter 910.

As described above, the first ruggedized exterior assembly 904 is usable in combination with the elongated connector core 902 to make the fiber optic connector system compatible with the first ruggedized adapter 908 and the second ruggedized exterior assembly 906 is usable in combination with the elongated connector core 902 to make the system compatible with the second ruggedized fiber optic adapter 910. In certain examples, the first and second ruggedized exterior assemblies 904, 906 are installed on the elongate connector core 902 by inserting the first or second shrouds 938, 960 in a front-to-rear direction over the front end 912 of the elongate connector core 902 and rearwardly onto the elongate connector core 902. In certain examples, it will be appreciated that the configuration of the first ruggedized fastening element 946 is different from the configuration of the second ruggedized fastening element 972. Additionally, it will be appreciated that the first keying arrangement 942 has a configuration that is different from the second keying arrangement 964.

In certain examples, the bayonet interface can be reversed such that pins are provided on the collar of the second ruggedized fiber optic adapter 910 while bayonet slots are provided within the bayonet sleeve. Similar to the first ruggedized fastening element 946, it will be appreciated that other configurations can be utilized for the second ruggedized fastening element 972. Additionally, different keying configurations also can be utilized. Thus, it should be appreciated that the keying configurations and the fastening configurations are provided for example only, and other types of configurations can be used as well.

In certain examples, the elongate connector core 902 is a precursor structure that is not intended to be mounted within a ruggedized fiber optic adapter without the use of a corresponding ruggedized exterior assembly. In other examples, the elongate connector core 902 can be converted to be compatible with a ruggedized fiber optic adapter without requiring the use of an intermediate shroud. For example, the plug end of the elongate connector core 902 can be provided with a DLX form factor (e.g., as shown at FIG. 31) and the elongate connector core 902 can be converted to a DLX-type connector by installing a fiber optic adapter seal over the exterior of the elongate connector core 902 adjacent the front end and by installing a ruggedized fastening element directly over the elongate connector core 902 without an intermediate shroud. In certain examples, the ruggedized fastening element can be secured to the elongate connector core 902 via the fastening structure 932.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES

20 a fiber optic connector
22 a connector body
24 a lengthwise axis
26 a release sleeve
28 a distal end
30 a proximal end
32 a boot
34 a fiber optic cable
36 an optical fiber
38 a ferrule
40 a spring
42 a fiber optic adapter
44, 46 first and second receptacles
48 an alignment sleeve
50 latches
52 exterior shoulders
54 ramp surfaces
56 distal portion
58 distal key
60 proximal portion
62 a smaller diameter portion
64 a larger diameter portion
66 a radial step
68 a proximal gripping portion
70 proximal key
80 port
82 structure
84 interior end
86 exterior notch
88 an outer circumferential seal
90 seal
120 another fiber optic connector
122 connector body
124 distal end
126 proximal end
128 ramped notches
129 ferrule
130 plug portion
132 an intermediate section
133 a radial shoulder
134 a proximal portion
135 sealing member
136 a resilient latch
138 base end
139 O-ring seal
144 inner hub
146 spring
148 rear extension
150 heat shrink or boot
152 catch
180 port
220 a connector arrangement
222 a fiber optic connector
224 port
226 closure
228 protective shell
230 connector body
232 shoulders
234 strain relief boot
235 fiber optic cable
236 ferrule
238 release sleeve
250 opening
252 exterior sleeve
254 external threads
260 a distal end
262 a proximal end
264 interior cavity
270 a sealing plug 320 a further connector arrangement
322 fiber optic connector
328 protective shell
329 retention member
352 modified release sleeve
353 proximal flange
420 connector arrangement
424 port structure
428 protective boot
520 connector arrangement
522 fiber optic connector
524 port
526 closure
528 protective shell
530 connector body
531 ferrule assembly
532 spring
533 ferrule
535 hub
537 central passage
539 front end
541 rear end
542 fiber optic adapter
543 alignment sleeve
545 front end
547 rear end
549 seal
551 circumferential groove
553 fastening nut
555 external threads
557 internal threads
559, 561 engagement portions
570 sealing and cable attachment unit
570A modified sealing and cable attachment unit
580 a fiber optic cable
582 optical fiber
584 jacket
590 rear body
592 central passage
594 snap-fit tabs
595 openings
596 radial seal
598 circumferential groove
599 rear pocket
600 a rear extension
602 internally threaded sleeve
604 strain relief boot
606 dust cap
608 internal threads
720 connector arrangement
724 port
725 first fiber optic cable
726 closure
727 second fiber optic cable
728 protective shell
741 first receptacle
742 fiber optic adapter
743 second receptacle
745 alignment sleeve
750 receptacle
760, 762 fiber optic connectors
763 front end
765 external threads
767 internal threads
769 flange
771 sealing surface
773 main body
775 rear extension
777 rear end
778 seal
780 a seal pressurization/deformation member
782 boot
820 fiber optic connection system
822 closure
824 port
825 first fiber optic cable
826 first fiber optic connector
827 second fiber optic cable
828 second fiber optic connector
830 connector body
842 fiber optic adapter
850 receptacle
851 spring
860 outer shell
862 front end
864 rear end
866 sealing element
868 radial shoulder
870 attachment element
872 rear extension
874 sealing element
876 sealing and cable attachment unit
877 forward end
878 radial flange
880 rear pocket
884 seal compression element
890 dust cap
892 port seal
900 fiber optic connector system
902 elongate connector core
904 first ruggedized exterior assembly
906 second ruggedized exterior assembly
908 first ruggedized fiber optic adapter
910 second ruggedized fiber optic adapter
912 front end
914 rear end
916 core housing
918 fiber optic cable
920 outer jacket
922 optical fiber
924 shape-memory sleeve
926 ferrule
928 seal
930 longitudinal midpoint
932 a fastening structure
934 strain-relief boot
935 tapered rear end
936 internal threads
938 first shroud
940 annular shoulder
942 first keying arrangement
944 paddles
946 first ruggedized fastening element
948 external threads
950 internal threads
952 alignment sleeve
953 exterior seal
954 fastening feature
960 second shroud
962 fastening feature
964 second keying arrangement
966 open ended slot
967 alignment sleeve
968 projection 970 exterior seal
972 second ruggedized fastening element
973 internal bayonet pins
975 bayonet slots

What is claimed is:

1. A fiber optic connector system comprising:
an elongate connector core including a core housing that extends from a front end defining a plug portion to a rear end defining a cable anchoring location, the core housing at least partially enclosing a ferrule at the front end, wherein a cable is anchored to the rear end of the elongate connector core, wherein an optical fiber of the cable is supported by the ferrule;
a first ruggedized exterior assembly configured to be mounted over the elongate connector core, the first ruggedized exterior assembly including a first shroud configured to be mounted in sealed relation over the elongate connector core, the first shroud having a forward end that includes a first keying arrangement for rotationally keying the first shroud relative to a first ruggedized fiber optic adapter, the first ruggedized exterior assembly also including a first ruggedized fastening element for securing the first ruggedized exterior assembly to the first ruggedized fiber optic adapter;
a second ruggedized exterior assembly configured to be mounted over the elongate connector core, the second ruggedized exterior assembly including a second shroud configured to be mounted in sealed relation over the elongate connector core, the second shroud having a forward end that includes a second keying arrangement for rotationally keying the second shroud relative to a second ruggedized fiber optic adapter, the first keying arrangement having a different keying configuration than the second keying arrangement, the second ruggedized exterior assembly also including a second ruggedized fastening element for securing the second ruggedized exterior assembly to the second ruggedized fiber optic adapter, the first ruggedized fastening element having a different fastening configuration than the second ruggedized fastening element;
wherein the first ruggedized exterior assembly is usable in combination with the elongate connector core to make the fiber optic connector system compatible with the first ruggedized fiber optic adapter and the second ruggedized exterior assembly is usable in combination with the elongate connector core to make the fiber optic connector system compatible with the second ruggedized fiber optic adapter; and
a third ruggedized fiber optic adapter configured to receive the elongate connector core without an intermediate shroud, wherein the elongate connector core is configured to have a form factor compatible with the third ruggedized fiber optic adapter, and wherein the elongate connector core is configured to be mounted in sealed relation with the third ruggedized fiber optic adapter.

2. The fiber optic connector system of claim 1, wherein the core housing includes multiple pieces.

3. The fiber optic connector system of claim 1, wherein the first keying arrangement includes paddles and the second keying arrangement includes an open ended slot.

4. The fiber optic connector system of claim 1, wherein the first ruggedized fastening element includes a threaded coupling nut and the second ruggedized fastening element includes a bayonet-style fastening sleeve.

5. The fiber optic connector system of claim 1, further comprising a shroud retainer mounted on the elongate connector core for use in selectively securing the first and second ruggedized exterior assemblies to the elongate core.

6. The fiber optic connector system of claim 5, wherein the shroud retainer is not configured to engage with a corresponding ruggedized fiber optic adapter.

7. The fiber optic connector system of claim 5, further comprising a tapered, strain relief boot for providing cable strain relief and bend radius protection adjacent the rear end of the elongate connector core, wherein the shroud retainer is integrated with the strain relief boot.

8. The fiber optic connector system of claim 7, wherein the shroud retainer includes threads.

9. The fiber optic connector system of claim 8, wherein the threads are provided within the strain relief boot adjacent a front end of the strain relief boot.

10. The fiber optic connector system of claim 7, wherein a shape-memory, heat shrink sleeve is positioned under the strain relief boot, and wherein the heat shrink sleeve provides a seal between the cable and the elongate connector core.

11. The fiber optic connector system of claim 1, wherein a seal is mounted on an exterior of the elongate connector core.

12. The fiber optic connector system of claim 11, wherein the seal provides sealing between the core housing of the elongate connector core and the first and second ruggedized exterior assemblies.

13. The fiber optic connector system of claim 11, wherein the seal on the elongate connector core is positioned rearward of a longitudinal midpoint of the elongate connector core.

14. The fiber optic connector system of claim 11, wherein the seal on the elongate connector core is not configured to engage with the third ruggedized fiber optic adapter.

15. The fiber optic connector system of claim 14, further comprising a fiber optic adapter seal mounted over the elongate connector core, the fiber optic adapter seal providing sealing between the elongate connector core and the third ruggedized fiber optic adapter.

16. The fiber optic connector system of claim 15, wherein the fiber optic adapter seal is mounted adjacent the front end of the core housing.

17. The fiber optic connector system of claim 14, further comprising a third ruggedized fastening element that secures the elongate connector core to the third ruggedized fiber optic adapter.

18. The fiber optic connector system of claim 17, wherein the third ruggedized fastening element is secured to the elongate connector core via a shroud retainer that is mounted on the elongate connector core for use in selectively securing the first and second ruggedized exterior assemblies to the elongate core.

19. The fiber optic connector system of claim 1, wherein the ferrule is spring biased towards the front end of the core housing of the elongate connector core.

20. The fiber optic connector system of claim 19, wherein a rotational orientation of the ferrule about its longitudinal axis is adjusted relative to the core housing to tune the fiber optic connector system by orienting a core offset of the fiber within the ferrule at a desired rotational orientation relative to the core housing.

* * * * *